US009623567B2

(12) United States Patent
Iwatake

(10) Patent No.: US 9,623,567 B2
(45) Date of Patent: Apr. 18, 2017

(54) ROBOT CONTROL DEVICE FOR CONTROLLING ROBOT MOVED ACCORDING TO APPLIED FORCE

(71) Applicant: FANUC CORPORATION, Yamanashi (JP)

(72) Inventor: Takahiro Iwatake, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 71 days.

(21) Appl. No.: 14/684,625

(22) Filed: Apr. 13, 2015

(65) Prior Publication Data

US 2015/0290798 A1 Oct. 15, 2015

(30) Foreign Application Priority Data

Apr. 14, 2014 (JP) ................................ 2014-082642

(51) Int. Cl.
*B25J 13/08* (2006.01)
*B25J 9/00* (2006.01)

(52) U.S. Cl.
CPC ........... *B25J 13/085* (2013.01); *B25J 9/0081* (2013.01)

(58) Field of Classification Search
CPC ........ B25J 9/0081; B25J 9/161; B25J 13/065; B25J 9/1694; B25J 9/1651; B25J 9/1612; B25J 9/1628; B25J 9/1633; B25J 9/1653; B25J 13/02; B25J 13/08–13/081; B25J 13/084–13/085; B25J 9/02; B25J 9/04; G06F 17/16; G05B 2219/35438; G05B 2219/37357; G05B 19/416; G05B 19/423; G05B 2219/40408; G01L 5/22; Y10S 901/02–901/04; Y10S 901/46
USPC ..... 700/258, 250, 253, 257; 901/2, 3, 4, 46; 318/568.13, 568.14, 568.16, 568.17, 318/568.18
See application file for complete search history.

(56) References Cited

U.S. PATENT DOCUMENTS 4,408,286 A 10/1983 Kikuchi et al.
5,880,956 A 3/1999 Graf
6,181,983 B1 * 1/2001 Schlemmer ............ B25J 9/1607 318/568.11

(Continued)

FOREIGN PATENT DOCUMENTS

CN 1676287 A 10/2005
CN 101195221 A 6/2008

(Continued)

*Primary Examiner* — Bao Long T Nguyen
(74) *Attorney, Agent, or Firm* — Hauptman Ham, LLP

(57) ABSTRACT

An operation command unit of a robot control device includes a first control mode that, when a near-singular configuration determination unit determines that a robot is not near a singular configuration, outputs an operation command for moving a position and/or a posture of the tip of the robot on the basis of an operation force calculated by a first force calculation unit and a second control mode that, when the near-singular configuration determination unit determines that the robot is near the singular configuration, outputs an operation command for moving the position of an operation axis set by an operation axis setting unit on the basis of an operation force calculated by a second force calculation unit and a moving direction set by the operation axis setting unit.

12 Claims, 16 Drawing Sheets

10a

| | |
|---|---|
| FORCE MEASUREMENT UNIT | 21 |
| FIRST FORCE CALCULATION UNIT | 22 |
| SECOND FORCE CALCULATION UNIT | 23 |
| OPERATION COMMAND UNIT | 24 |
| OPERATION AXIS SETTING UNIT | 25 |
| STORAGE UNIT | 26 |
| NEAR-SINGULAR CONFIGURATION DETERMINATION UNIT | 27 |
| DISPLAY OUTPUT UNIT | 71 |

(56) References Cited

U.S. PATENT DOCUMENTS

| | | | | |
|---|---|---|---|---|
| 6,786,896 | B1 * | 9/2004 | Madhani ............ | A61B 19/2203 128/898 |
| 2005/0222714 | A1 | 10/2005 | Nihei et al. | |
| 2015/0158181 | A1 * | 6/2015 | Kawamura ............ | B25J 9/1697 700/259 |

FOREIGN PATENT DOCUMENTS

| | | | |
|---|---|---|---|
| CN | 103347662 | A | 10/2013 |
| CN | 103600354 | A | 2/2014 |
| DE | 102007062108 | A1 | 7/2009 |
| DE | 102009018403 | A1 | 10/2010 |
| DE | 102012009010 | A1 | 12/2012 |
| JP | 56-85106 | A | 7/1981 |
| JP | 06-250728 | A | 9/1994 |
| JP | 11-239988 | A | 9/1999 |
| JP | 4267027 | B2 | 5/2009 |

* cited by examiner

ROBOT CONTROL DEVICE FOR CONTROLLING ROBOT MOVED ACCORDING TO APPLIED FORCE

RELATED APPLICATIONS

The present application claims priority to Japanese Application Number 2014-082642, filed Apr. 14, 2014, the disclosure of which is hereby incorporated by reference herein in its entirety.

BACKGROUND OF THE INVENTION

1. Field of the Invention

The present invention relates to a robot control device for controlling a robot moved according to a force applied to the robot. More specifically, the invention relates to a robot control device of a robot system that moves a robot on the basis of a force applied to the robot that includes a plurality of axes.

2. Description of the Related Art

Direct teaching is known as a robot operation method for moving a robot by applying a force to the robot or a method for teaching a position by moving the robot. In such a case, force is applied in a direction to which the robot is desired to be moved to directly guide the robot, whereby the robot can be moved to a desired position and/or a desired posture on an orthogonal coordinate system.

Japanese Laid-open Patent Publication No. S56-85106 discloses a method for moving a position and a posture of a tip of a robot arm on the basis of a signal generated by a force detector when operating a manual operation unit of the force detector attached to the tip of the robot arm.

Japanese Laid-open Patent Publication No. H6-250728 discloses a direct teaching device. In this device, a force sensor attached to a robot detects an artificially applied force, and with the use of a signal of the force, a position and a posture of the robot are moved while moving a robot arm only in a specific direction on a Cartesian coordinate system.

Japanese Laid-open Patent Publication No. H11-239988 discloses a singular point avoiding method in direct teaching. In this method, when moving the robot in direct teaching, a velocity component that a tip of the robot arm cannot achieve at a singular point is attenuated by a correction formula defined in advance as the tip thereof becomes closer to the singular point. The singular point is a state where the robot is in a singular configuration.

Singular configuration is a posture that results in a state where a position and/or a posture of the tip of the robot arm on an orthogonal coordinate system cannot be uniquely inversely converted to a position of each axis, a posture that results in a state where the position and/or the posture of the tip of the robot arm on the orthogonal coordinate system cannot be moved in a certain direction, and a posture that results in a state where a Jacobian matrix representing a relationship between a velocity of the tip of the robot arm and joint velocity is not a full rank. In the position and/or the posture of the tip thereof near such a singular configuration, it tends to be difficult to change the position and/or the posture thereof on the orthogonal coordinate system, there can be a axis that moves at an excessive velocity, or movement operation of the robot tends to be unstable in positional control. Under such circumstances, an operator may be in danger during direct teaching. To avoid such danger, the conventional techniques relate to a method for decelerating/stopping a robot in direct teaching, a trajectory shifting method for avoiding singular configuration, and the like.

In Japanese Laid-open Patent Publication No. S56-85106, the position and/or the posture of the tip of the robot arm on the orthogonal coordinate system is moved according to the force. Due to this, in the method of Japanese Laid-open Patent Publication No. S56-85106, the tip of the robot arm cannot be moved near singular configuration. In addition, in Japanese Laid-open Patent Publication No. S56-85106, the position of desired each axis cannot be moved during direct teaching.

In Japanese Laid-open Patent Publication No. H6-250728, when moving the robot by direct teaching, the moving direction of the robot is limited to the specific direction to improve operability. The specific direction is a direction associated with the position and/or the posture of the tip of the robot arm on the Cartesian coordinate system. Accordingly, Japanese Laid-open Patent Publication No. H6-250728 does not propose limitation to a axis to be driven and the like, such as switching to control of each axis and driving of only a specific desired axis in direct teaching.

In Japanese Laid-open Patent Publication No. H11-239988, the trajectory is changed by setting the velocity component that cannot be achieved at the singular point to zero so that the tip of the robot arm does not pass through the singular point. As a result, in Japanese Laid-open Patent Publication No. H11-239988, the trajectory can be shifted in a direction different from the direction of the force applied to the robot, whereby the robot can be moved to a position not intended by the operator. Additionally, a certain task requires movement of the robot to a position near a singular configuration. However, even in such a case, in Japanese Laid-open Patent Publication No. H11-239988, the robot cannot be moved to or near the singular configuration.

The present invention has been accomplished in view of such circumstances. It is an object of the invention to provide a robot control device that, when moving a position and/or a posture of a tip of a robot on an orthogonal coordinate system by moving the robot with application of a force to the tip of the robot arm, allows the tip thereof to be moved to a position to which it is difficult or impossible to move the tip thereof. In addition, during the movement of the position and/or the posture of the tip of the robot arm on the orthogonal coordinate system by applying a force to the tip thereof, it is desired that a robot moving mode is switched without using any specific input device or the like and without performing any input task or the like for switching the moving mode. Furthermore, it is desired that the robot is moved stably even in the vicinity of a singular configuration during direct teaching.

SUMMARY OF THE INVENTION

In order to achieve the aforementioned object, according to a first aspect of the invention, there is provided a robot control device of a robot system that moves a robot on the basis of a force applied to the robot that includes a plurality of axes, the robot control device including: a force measurement unit that measures the force applied to a tip of the robot; a first force calculation unit that calculates an operation force for performing a movement operation of at least one of a position and a posture of the tip of the robot on the basis of the force measured by the force measurement unit; a second force calculation unit that calculates an operation force for performing a movement operation of a position of each of the plurality of axes of the robot on the basis of the force measured by the force measurement unit; an operation command unit that outputs an operation command for moving the robot on the basis of the force measured by the force measurement unit; a near-singular configuration determination unit that determines whether or not the robot is near a singular configuration; and an operation axis setting unit that, according to a current position of each of the axes at a time when the near-singular configuration determination unit determines that the robot is near the singular configuration, sets one or more predetermined axes including a axis that acts as a factor for being near the singular configuration or a axis that is caused to pass through near the singular configuration as one or more operation axes that are moved according to the force, and sets a moving direction of the one or more operation axes determined according to a direction of the force, in which the operation command unit includes a first control mode that, when the near-singular configuration determination unit determines that the robot is not near the singular configuration, outputs an operation command for moving the at least one of the position and the posture of the tip of the robot on the basis of the operation force calculated by the first force calculation unit and a second control mode that, when the near-singular configuration determination unit determines that the robot is near the singular configuration, outputs an operation command for moving a position of the one or more operation axes set by the operation axis setting unit on the basis of the operation force calculated by the second force calculation unit and the moving direction set by the operation axis setting unit.

According to a second aspect of the invention, there is provided a robot control device of a robot system that moves a robot on the basis of a force applied to the robot that includes a plurality of axes, the robot control device including: a force measurement unit that measures the force applied to a tip of the robot; a first force calculation unit that calculates an operation force for performing a movement operation of at least one of a position and a posture of the tip of the robot on the basis of the force measured by the force measurement unit; a second force calculation unit that calculates an operation force for performing a movement operation of a position of each of the plurality of axes of the robot on the basis of the force measured by the force measurement unit; an operation command unit that outputs an operation command for moving the robot on the basis of the force measured by the force measurement unit; a axis position state determination unit that determines whether or not a position of one or more predetermined axes is a position of a state satisfying a predetermined positional relationship condition; and an operation axis setting unit that, according to a current position of each of the axes of the robot at a time when the axis position state determination unit determines that the one or more predetermined axes are in the position of the state, sets one or more predetermined axes including a axis that acts as a factor for being in the position of the state or a axis that is caused to pass through the position of the state as one or more operation axes that are moved according to the force, and sets a moving direction of the one or more operation axes determined according to a direction of the force, in which the operation command unit includes a first control mode that, when the axis position state determination unit determines that the one or more predetermined axes are not in the position of the state, outputs an operation command for moving the at least one of the position and the posture of the tip of the robot on the basis of the operation force calculated by the first force calculation unit and a second control mode that, when the axis position state determination unit determines that the one or more predetermined axes are in the position of the state, outputs an operation command for moving a position of the one or more operation axes set by the operation axis setting unit on the basis of the operation force calculated by the second force calculation unit and the moving direction set by the operation axis setting unit.

According to a third aspect of the invention, in the first or the second aspect, the operation axis setting unit sets the moving direction determined according to a direction of a force applied to the one or more operation axes on the basis of the direction of the force applied to the one or more operation axes and the moving direction of the one or more operation axes immediately before being switched to the second control mode or at the time when switched to the second control mode.

According to a fourth aspect of the invention, in any of the first to the third aspects, in the second control mode, the operation command unit moves a position of an origin of an operation axis of the one or more operation axes that is moved in a direction opposite to the direction of the force applied to the axis in a direction including a component of a direction opposite to a direction in which the position of the tip of the robot is moved by motion of the one or more operation axes or in a direction including a component of the direction of the force applied to the one or more operation axes.

According to a fifth aspect of the invention, in any of the first to the fourth aspects, when the operation command unit switches from one of the control modes to the other one of the control modes between the two control modes: the first control mode and the second control mode, the operation command unit switches after decelerating/stopping all of the axes or making a velocity of all of the axes smaller than a predetermined threshold value.

According to a sixth aspect of the invention, in any of the first to the fifth aspects, when the operation command unit switches from the first control mode to the second control mode between the two control modes: the first control mode and the second control mode, the operation command unit decelerates/stops axes other than axes that are operated in the second control mode.

According to a seventh aspect of the invention, in any of the first to the sixth aspects, the robot control device further includes a display output unit that performs a display output as to which of the first control mode and the second control mode is set, and in the second control mode, performs a display output of the one or more operation axes set by the operation axis setting unit and the moving direction determined according to the direction of the force applied to the one or more operation axes.

The foregoing and other objects, features, and advantages of the present invention will become more apparent from the following detailed description of typical embodiments of the invention illustrated in the accompanying drawings.

DETAILED DESCRIPTION

Figure 1:
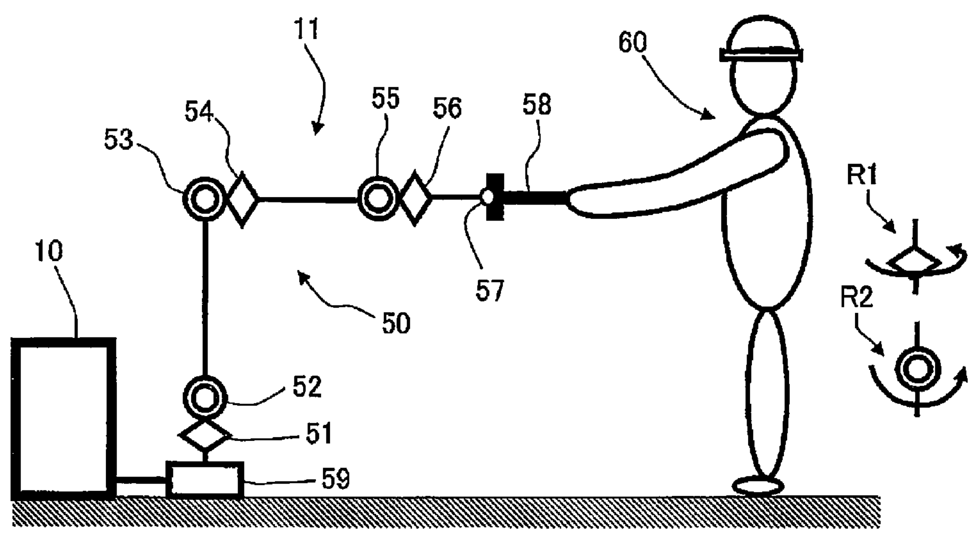
FIG. 1 is a diagram depicting a schematic structure of a robot system provided with a robot controlled by a robot control device according to a first embodiment of the present invention.

Hereinafter, exemplary embodiments of the present invention will be described with reference to the accompanying drawings. In the drawings below, the same members are denoted by the same reference numerals. For easier understanding, scales of the drawings are changed as appropriate.

Hereinafter, the term "force" is assumed to include a translational component of a force and a moment component of the force. Additionally, the phrase "position and/or posture" is assumed to mean position or posture, or position and posture.

In addition, hereinafter, the term "axis" represents a joint portion connecting links forming a robot to each other, and is assumed to be a portion that changes a positional relationship and an angular relationship between the links. Changing a position of a axis (i.e., changing an angle of a rotation axis) allows changing of the positional relationship between the links, as a result of which the position and/or the posture of a tip of the robot arm can be changed. There may be arranged an actuator for moving a axis position at a portion different from a axis portion.

In addition, a force applied around a rotation center line of a axis of the robot, a force acting around the rotation center line of the axis of the robot, or a force acting on an operation axis where the operation axis is a rotation axis is assumed to be, when the axis of the robot is a rotation axis and a coordinate system is set with respect to the axis of the robot in such a manner that an axis of the coordinate system is coincident with the rotation center line of the axis of the robot, a force in a translational direction or a moment of a force applied around the rotation center line of the axis of the robot existing on a plane orthogonal to the rotation center line of the axis of the robot on the coordinate system whose origin is an intersection point of the rotation center line of the axis of the robot and the plane.

In addition, in the present invention, force control gain means a coefficient for obtaining an amount of movement of the position and/or the posture of the tip of the robot arm, a position of each axis of the robot, and the like on an orthogonal coordinate system at each control cycle on the basis of a magnitude of an applied force in a force control for moving the robot according to the applied force.

FIG. 1 is a schematic diagram depicting a structural example of a robot system 11 provided with a robot 50 controlled by a robot control device 10 according to an embodiment of the invention. The robot system 11 is provided with the robot control device 10 and the robot 50 in which a position of each axis at each control cycle is controlled by the robot control device 10.

In the robot system 11, when an operator 60 applies a force to a tip 58 of the robot 50, the robot control device 10 controls an actuator for moving each axis of the robot 50 on the basis of the force applied to the tip 58 of the robot 50 measured by a force measurement unit, set data, position data of the robot 50, and the like. In this way, positions of the axes forming the robot 50 are changed, whereby the robot 50 can be moved.

The robot control device 10 has a hardware structure including a calculation processing unit, a ROM, and a RAM, and executes various functions that will be described later.

The robot 50 depicted in FIG. 1 includes six axes. These six axes are assumed to be set as follows, in order from a side of the robot 50 closer to a base thereof: a first axis is J1 axis 51; a second axis is J2 axis 52; a third axis is J3 axis 53; a fourth axis is J4 axis 54; a fifth axis is J5 axis 55; and a sixth axis is J6 axis 56.

As indicated on the right side of FIG. 1, the J1 axis 51, the J4 axis 54, and the J6 axis 56 are formed as rotation axes R1 rotating around links connecting the axes to each other. Additionally, the J2 axis 52, the J3 axis 53, and the J5 axis 55 are formed as rotation axes R2 rotating around a direction orthogonal to the links connecting the axes to each other.

FIG. 1 is a simple illustrative view for representing a structure of the axes of the robot 50. In addition, when an origin of each axis is assumed to be an origin of a coordinate system set at the each axis and also a point at which the links are connected to each other, a position of the origin of the each axis is assumed to be represented as a position thereof on a coordinate system set in a space. Hereinafter, the coordinate system set in the space is assumed to be a reference coordinate system. Axial origins of the J1 axis 51 and the J2 axis 52 are assumed to be in the same position, origins of the J3 axis 53 and the J4 axis 54 are assumed to be in the same position, and origins of the J5 axis 55 and the J6 axis 56 are assumed to be in the same position.

In the present practical example, when it is described with respect to a axis set as a rotation axis that the position of the axis is moved, the position of the axis is assumed to mean an angle of the rotation axis, and moving the position of the axis is assumed to mean rotating the rotation axis to change the position thereof. Additionally, when referring to the position of the origin of a axis, it is assumed to represent a position of the origin of the coordinate system set at each axis on the coordinate system set with respect to the space. Furthermore, the coordinate system set with respect to the space is assumed to be a coordinate system for representing positions and/or postures of the tip 58 of the robot 50, a flange 57 used for attaching the tip 58 to the robot 50, the coordinate system set at each axis, and the like, on an orthogonal coordinate system fixed with respect to the space.

In addition, a coordinate system set with respect to the robot 50 in order to represent a position and/or a posture of the robot 50 on the reference coordinate system set with respect to the space is assumed to be a tool coordinate system. The origin of the tool coordinate system, which is a point that is translationally moved or a center point of rotational movement, is assumed to be a control point. A coordinate system where a coordinate system parallel to the reference coordinate system is set at the control point is assumed to be a control coordinate system. The position of the control point may be an arbitrary position as long as it is a position set with respect to the robot 50.

In the present practical example, all of the six axes of the robot 50 are assumed to be rotational axes. However, the robot 50 may include a linear motion axis. In addition, although the robot 50 is a vertical multi-joint robot having the six axes, the robot 50 can be an arbitrary known robot having another configuration as long as it is a robot that allows control of the position of each axis and control of orthogonal position.

The tip 58 of the robot 50 is a portion with an object attached to the flange 57 of the robot 50. A six-axis force sensor is attached to the tip 58 of the robot 50, although not depicted in the drawing. The robot control device 10 causes a force measurement unit 21, which will be described later, to measure a force applied to the tip 58 of the robot 50 by the operator 60 on the basis of an output of the force sensor detected at each predetermined time interval.

The force measurement unit 21 sets a coordinate system having the origin at a point where the force at the tip 58 of the robot 50 is measured. Then, the force measurement unit 21 measures, as the force applied to the tip 58 of the robot 50, a translational component F of the force and a moment component M of the force on the coordinate system. Hereinafter, the coordinate system is assumed to be a force measurement coordinate system, and the origin of the coordinate system is assumed to be a force measurement point. In this case, translational components of the force on an X axis, a Y axis, and a Z axis, respectively, of the coordinate system set at the tip 58 of the robot 50 are represented as Fx, Fy, and Fz, respectively, as well as moment components of the force detected around the X axis, the Y axis, and the Z axis, respectively, are represented as Mx, My, and Mz, respectively.

The force measurement point may be a force applied point where the operator applies a force, the origin of a sensor coordinate system set at the force sensor, an axial point of the sensor coordinate system, or the like.

In the present practical example, six components of the force are measured. However, only the translational component F of the force or only the moment component M of the force may be measured. In addition, a force sensor attachment position may be an arbitrary position as long as a force applied to the tip 58 of the robot 50 can be measured. In addition, the measurement unit for measuring the force applied to the tip 58 of the robot 50 may be a force sensor having three axes, instead of a force sensor having six axes.

In addition, the force measurement unit 21 may estimate the force applied to the tip 58 of the robot 50 on the basis of an electric current value where the actuator for moving each of the axes forming the robot 50 is a motor, a deviation between a commanded position of each axis and an actual position thereof, an output of a torque sensor attached to each axis, or the like.

To the tip 58 of the robot 50 are attached a tool for performing tasks including processing of a workpiece and carrying of the workpiece, a maneuvering device for performing a movement operation according to the force, and the like.

The tool and the maneuvering device may be attached to the force sensor attached to the robot 50. Alternatively, the force sensor may be attached to the tool attached to the robot 50, and the maneuvering device may be attached to a tip side of the force sensor.

When applying a force to the tip 58 of the robot 50, the force may be applied to the tool attached to the force sensor without using the maneuvering device. Alternatively, the force may be applied to the maneuvering device attached to the force sensor.

When an operator moves the robot 50 by applying a force to the tool or the maneuvering device attached to the force sensor, the force measurement unit 21 compensates, as needed, for an influence of the tool or the maneuvering device attached to the force sensor or a gripped object such as a workpiece on a force detected by the force sensor caused due to gravity, inertia force (including Coriolis force and Gyroscopic precession), or the like. In this way, the force measurement unit 21 can measure a net force applied to the tip 58 of the robot 50 by the operator.

When a device as a combination of the force sensor and the maneuvering device is attached to the tool attached to the tip 58 of the robot 50, the influence of an object attached to the force sensor on the force sensor caused due to gravity and inertia force becomes small. Accordingly, in this case, an error in obtaining the net force also becomes small.

In addition, the device as the combination of the force sensor and the maneuvering device may be attached to the tool by using a magnet, a spring, or the like. In this case, such a device can be easily detached. It is also possible to attach such a device only at the time when moving the robot 50 by application of a force. This allows the device to be detached when teaching operation is unnecessary or allows such a device to be used in another robot system, as needed.

Figure 2:
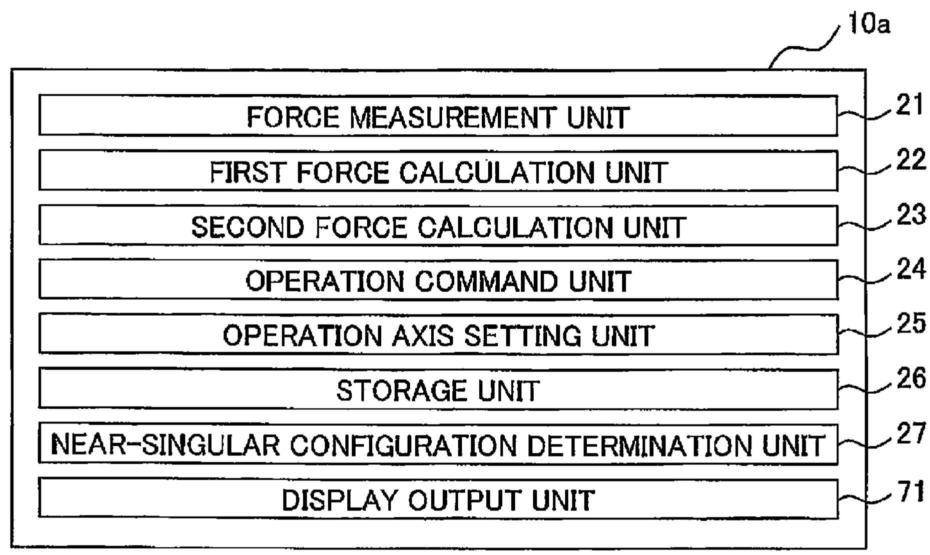
FIG. 2 is a diagram functionally depicting a structure of a robot control device according to the first embodiment of the invention.

FIG. 2 is a diagram functionally depicting a structure of a robot control device 10*a* according to a first embodiment of the present invention. As depicted in the drawing, the robot control device 10*a* includes the force measurement unit 21 described later, a first force calculation unit 22, a second force calculation unit 23, an operation command unit 24, an operation axis setting unit 25, a storage unit 26, a near-singular configuration determination unit 27, and a display output unit 71.

The force measurement unit 21 measures a net force applied to the tip 58 of the robot 50 by the operator 60. As described above, the force measurement unit 21 compensates, as needed, for the influence of the tool or the maneuvering device attached to the tip 58 of the robot 50 or a gripped object such as a workpiece caused due to gravity, inertia force (including Coriolis force and Gyroscopic precession), and the like.

The influence of the gravity and the inertia force caused by the object attached to the force sensor is compensated for by a known method as follows. Before the operator applies a force to the object attached to the force sensor, a mass and a center of gravity of the object are calculated in advance. Then, the calculated mass and center of gravity, and a moving motion of the robot are referred to and a known method, such as a technique disclosed in Japanese Patent No. 4267027, is used for calculation.

The first force calculation unit 22 calculates an operation force for moving a position and/or a posture of the tip 58 of the robot 50 on the orthogonal coordinate system on the basis of a force including a translational component and/or a moment component of the force applied to the tip 58 of the robot 50 measured by the force measurement unit 21.

The first force calculation unit 22 calculates the operation force, for example, in the following manner. The force measured by the force measurement unit 21 is converted into a force on the control coordinate system to calculate the operation force. At this time, a direction and a magnitude of the operation force may be adjusted, as needed, considering a moving direction, a moving velocity, and the like of the robot during operation. This can improve operability in movement of the robot according to the force.

The second force calculation unit 23 calculates an operation force for moving the position of each axis of the robot 50 on the basis of the force including the translational component and/or the moment component of the force applied to the tip 58 of the robot 50 measured by the force measurement unit 21.

The second force calculation unit 23 calculates the operation force in the following manner, for example when the axis to be moved is a rotation axis, as in the present practical example.

The second force calculation unit 23 calculates the operation force on the basis of an actual force applied to the tip 58 of the robot 50 measured by the force measurement unit 21. Alternatively, the second force calculation unit 23 calculates, as an operation force, a virtual force as a force that is assumed to be virtually applied to a axis to be moved, on the basis of the force applied to the tip 58 of the robot 50.

Specifically, the operation force will be calculated as follows.

When a translational force applied to the tip 58 of the robot 50 is projected on a place orthogonal to a rotation center line of a axis to be moved, the direction of an operation force for moving the axis is determined on the basis of whether the force is oriented in a positive rotation direction or a negative rotation direction with respect to the axis, i.e., on the basis of the direction of the translational force applied around the rotation center line of the axis. A magnitude of the operation force is obtained on the basis of a magnitude of the translational force measured by the force measurement unit 21, a magnitude of the projected force, or a magnitude of a component of the projected force orthogonal to a position vector from the rotation center line to a point of application of the projected force.

In addition, the operation force may be obtained by calculating a moment of the force around the rotation center line of the axis to be moved on the basis of the force applied to the tip 58 of the robot 50 measured by the force measurement unit 21.

Additionally, when calculating the moment of the force applied around the rotation center line of the axis to be moved on the basis of the force applied to the tip 58 of the robot 50 measured by the force measurement unit 21, the moment may be calculated by devising methods for calculating a force vector and a position vector, as appropriate so as to improve operability, thereby obtaining the operation force.

In addition, the direction of the operation force for moving the axis may be determined on the basis of whether the sign of the moment of the force applied, with respect to the axis to be moved, around the rotation center line of the axis is positive or negative, as well as the magnitude of the operation force appropriate according to operation may be obtained on the basis of the magnitude of the force measured by the force measurement unit 21.

The direction of the operation force can be any as long as it is a direction that can determine a moving direction for the axis to be moved, which is a direction that determines a forward direction or a reverse direction, such as a positive/negative sign.

In addition, in order to improve operability of the robot when moving a axis according to force, the operation force is preferably adjusted considering a moving direction, a moving velocity, and the like of the robot during operation, as needed.

The present practical example has illustrated the case of the rotation axis as the axis to be moved. However, when the axis to be operated is a linear motion axis, a translational component of the force in the direction of the axis is calculated.

The near-singular configuration determination unit 27 determines whether or not the robot 50 is near a singular configuration. There are some methods for determining whether or not the robot 50 is near the singular configuration. First, there is a method based on a Jacobian matrix representing a relationship between velocity of the tip 58 of the robot 50 and joint velocity. When the Jacobian matrix in a current position of each axis of the robot 50 is not a full rank or when a value of a matrix formula of the Jacobian matrix is smaller than a predetermined threshold value, the posture of the robot 50 can be determined to be near the singular configuration. In this way, it can be determined whether or not the current position of each axis of the robot 50 is in the singular configuration.

When the robot 50 is determined to be near the singular configuration by the determination method, the near-singular configuration determination unit 27 determines in more detail regarding the state of the vicinity of the singular configuration on the basis of the current position of each axis of the robot 50 by using a method described later. Then, the operation axis setting unit 25 described later is caused to set a axis that acts as a factor for being near the singular configuration or a axis that is caused to pass through near the singular configuration.

Additionally, depending on whether or not the position of each axis of the robot satisfies a predetermined positional relationship condition, it can be determined whether or not the current position of each axis of the robot is near the singular configuration. With this method, it is determined whether or not the robot is near the singular configuration, and also it is determined which type described later the singular configuration belongs to. Then, the operation axis setting unit 25 described later may be caused to set the axis that acts as the factor for being near the singular configuration or the axis that is caused to pass through near the singular configuration. This method will be described hereinbelow.

Singular configuration can be classified into some states. Depending on the position of each axis of the robot 50, the singular configuration may belong to a plurality of types. On the basis of a result of determination as to which of the states of singular configuration the singular configuration is in, the operation axis setting unit 25 described later sets a axis to be operated.

The following will be how to determine whether or not the robot 50 is in a singular configuration and which type the singular configuration belongs to. Specifically, for each state of singular configuration, i.e., for each type of singular configuration, it is determined regarding one or more axes that are factors indicating that the robot 50 is near the singular configuration whether or not the position of each axis satisfies a predetermined positional relationship condition, i.e., whether or not the position of each axis is within a range of a threshold value from a predetermined position set for the each axis. Alternatively, depending on the positional relationship between the plurality of axes, it is determined whether or not the robot 50 is in a singular configuration and which type the singular configuration belongs to, by determining whether or not the position of the origin of a certain axis on the reference coordinate system satisfies the predetermined positional relationship condition.

At this time, the threshold value used by the near-singular configuration determination unit 27 may be made large so as to enlarge a region determined as being near singular configuration. In this case, instability of operation in a first control mode, which will be described later, can be detected more safely and earlier to allow switching to a second control mode. In order to detect that the robot is near the singular configuration where the first control mode is unstable, a matrix formula of a Jacobian matrix or the like may be used as described above. Even in this case, setting the threshold value appropriately allows early detection of instability of operation in the first control mode.

In the second control mode, operation rarely becomes unstable due to the position of the robot even when the robot is near singular configuration. Accordingly, when the robot 50 is near singular configuration, switching to the second control mode allows the movement operation of the robot 50 according to force to be more stabilized and performed more safely. However, when the region determined as being near singular configuration is excessively enlarged, a region for movement in the first control mode is reduced. Accordingly, the region determined as being near singular configuration is preferably maintained within an appropriate range.

Next, classification of singular configuration will be described. Furthermore, a description will be given of a axis that acts as a factor for being near a singular configuration or a axis that is caused to pass through near the singular configuration, which is considered when the operation axis setting unit 25 described later sets an operation axis.

Figure 3:
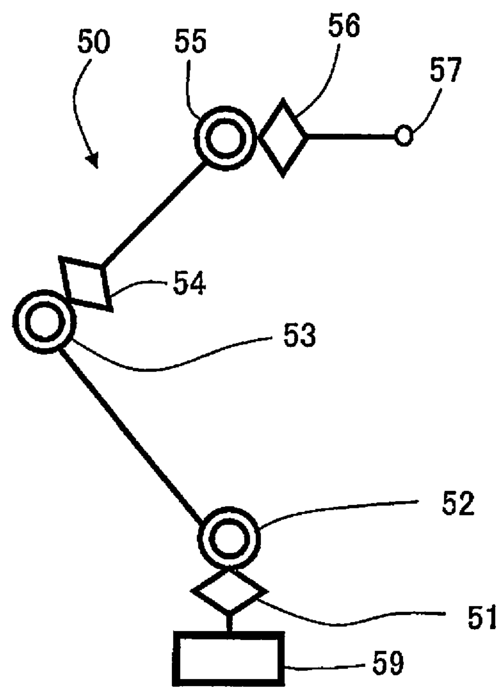
FIG. 3 is a diagram depicting a first singular configuration.
Figure 4:
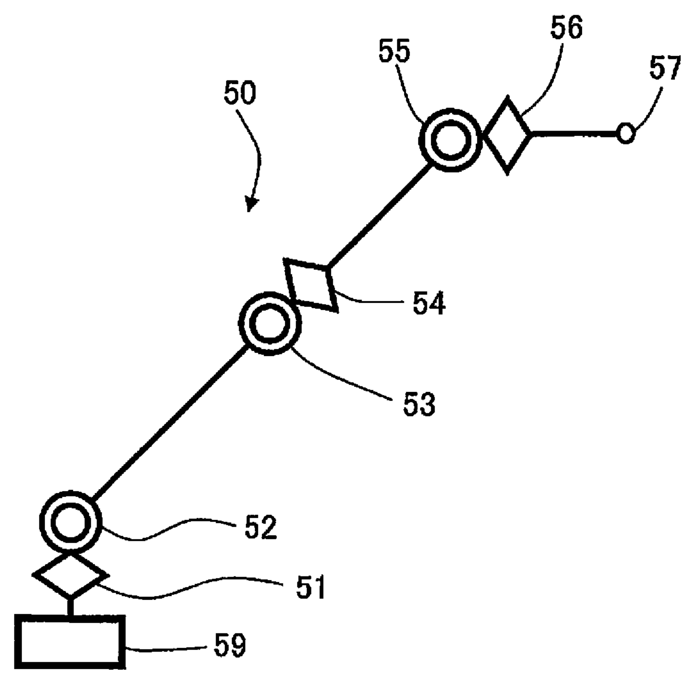
FIG. 4 is a diagram depicting a second singular configuration.
Figure 5:
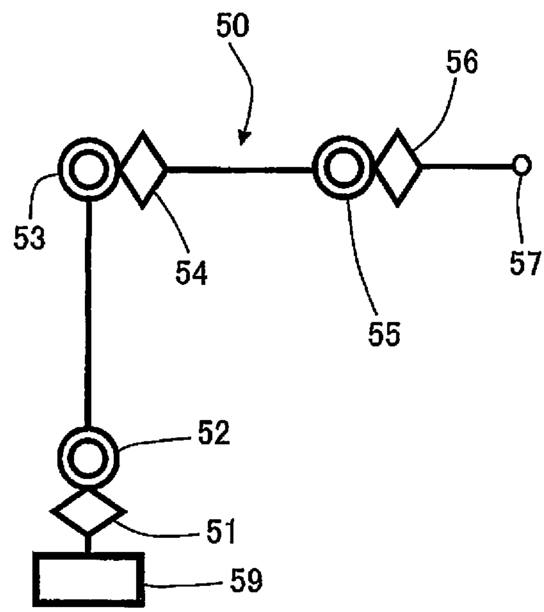
FIG. 5 is a diagram depicting a third singular configuration.

In the present practical example, singular configuration is classified into three types: a first singular configuration depicted in FIG. 3, a second singular configuration depicted in FIG. 4, and a third singular configuration depicted in FIG. 5.

In the first singular configuration depicted in FIG. 3, the origin of the J5 axis 55 is located on a rotation center line of the J1 axis 51 of the robot 50. It can be determined that the robot 50 is near the first singular configuration depending on whether or not a predetermined positional relationship condition is satisfied, i.e., whether or not a position of the origin of the J5 axis 55 obtained in a forward conversion of the axes from the J1 axis to the J5 axis is located on the rotation center line of the J1 axis 51 or therenear on the reference coordinate system set in the space. In this case, the axis that acts as a factor for being near the first singular configuration or the axis that is caused to pass through near the first singular configuration is the J2 axis 52 or the J3 axis 53.

In the second singular configuration depicted in FIG. 4, the origin of the J2 axis 52, the origin of the J3 axis 53, and the origin of the J5 axis 55 of the robot 50 are located on a straight line. It can be determined that the robot 50 is near the second singular configuration depending on whether or not the position of an angle made by the J2 axis 52 and the J3 axis 53 satisfies a predetermined positional relationship condition. Specifically, it can be determined that the robot 50 is near the second singular configuration depending on whether or not a predetermined positional relationship condition is satisfied, i.e., whether or not the origin of the J2 axis 52, the origin of the J3 axis 53, and the origin of the J5 axis 55 are in a positional relationship located on the straight line and therenear. In this case, the axis that acts as a factor for being near the second singular configuration or the axis that is caused to pass through near the second singular configuration is the J3 axis 53.

In the third singular configuration depicted in FIG. 5, the origin of the J3 axis 53, the origin of the J5 axis 55, and an origin of the flange 57 of the robot 50 are located on a straight line. It can be determined that the robot 50 is near the third singular configuration depending on whether or not the position of an angle of the J5 axis 55 satisfies a predetermined positional relationship condition. Specifically, it can be determined that the robot 50 is near the third singular configuration depending on whether or not a predetermined positional relationship condition is satisfied, i.e., whether or not the origin of the J3 axis 53, the origin of the J5 axis 55, and the origin of the flange 57 are in the positional relationship located on the straight line and therenear. In this case, the axis that acts as a factor for being near the third singular configuration or the axis that is caused to pass through near the third singular configuration is the J5 axis 55.

In this way, on the basis of the current position of each axis of the robot, it is determined whether or not the robot 50 is near any singular configuration and which type the singular configuration belongs to. Then, a determination can be made regarding the axis that acts as a factor of singular configuration or the axis that is caused to pass through near the singular configuration.

When the robot 50 is determined to be near a singular configuration, the operation axis setting unit 25 sets, as an operation axis to be moved according to force, one or more predetermined axes including a axis that acts as a factor for being near the singular configuration or a axis that is caused to pass through near the singular configuration, on the basis of the current position of each axis of the robot 50. Additionally, the operation axis setting unit 25 also sets a moving direction of the operation axis determined according to force.

At this time, the moving direction of the operation axis determined according to the direction of the force is set on the basis of a predetermined value or on the basis of the moving direction of the operation axis and a direction of the force applied to the operation axis when the robot is near the singular configuration.

When the operation axis is set by selecting one or more axes from among the plurality of axes, the axis that acts as the factor of being near singular configuration or the axis that is caused to pass through near the singular configuration is determined on the basis of the type of the singular configuration determined by the current position of each axis when the robot 50 is near the singular configuration. Then, one or more predetermined axes including the above-mentioned axis are set as one or more operation axes, depending on the type of the singular configuration. When the posture of the robot 50 corresponds to a plurality of types of singular configurations, one or more operation axes are set on the basis of the type of a singular configuration having higher priority according to a predetermined priority ranking. Then, the one or more operation axes are intended to include a axis that acts as the factor of the singular configuration or a axis that is caused to pass through near the singular configuration.

At this time, from among the axes other than the axis that acts as the factor of the singular configuration or the axis that is caused to pass through near the singular configuration, one or more predetermined axes are selected as one or more operation axes on the basis of the position of each axis of the robot 50 at that time.

In the first singular configuration depicted in FIG. 3, the axis that acts as the factor for being near the singular configuration or the axis that is caused to pass through near the singular configuration is the J2 axis 52 or the J3 axis 53. Either the J2 axis 52 or the J3 axis 53 is set as the operation axis to be moved according to force and moved. This allows the robot 50 to pass through near the first singular configuration.

The rotation center lines of both of the J2 axis 52 and the J3 axis 53 of the robot 50 are assumed to be parallel and oriented in the same direction. At this time, when both of the J2 axis 52 and the J3 axis 53 are moved as operation axes, these axes are moved around the rotation center lines thereof in the same rotation direction, whereby the robot 50 can more quickly pass through near the first singular configuration than when either one of the axes is moved. In addition, in this case, even when both of the J2 axis 52 and the J3 axis 53 are moved around the rotation center lines thereof in different rotation directions, moving each of the axes at an appropriate velocity allows the robot 50 to pass through near the first singular configuration. In relation to the above description, when the rotation center lines of the plurality of axes in movement operation of each of the plurality of axes are parallel, the plurality of axes may be moved more quickly in a certain direction by rotationally moving the axes in the same direction.

When moving each axis near the singular configuration, a axis having a rotation center line orthogonal to the rotation center line of the J2 axis 52 or the J3 axis 53 may be made movable as the operation axis. In this case, the axis can be moved independently from the J2 axis 52 and the J3 axis 53.

In addition, when the J2 axis 52 or the J3 axis 53 is set as the operation axis, there can be a axis that moves independently from the J2 axis 52 or the J3 axis 53 or moves simultaneously with J2 axis 52 or the J3 axis 53 depending on the direction of the force applied to the tip 58 of the robot 50. The axis is preferably a axis that can be moved independently from the J2 axis 52 or the J3 axis 53. However, even when the axis moves simultaneously with the J2 axis 52 or the J3 axis 53 depending on the direction of the force applied to the tip 58 of the robot 50, the axis may be set as the operation axis as long as there is no problem due to the motion. At this time, an operation force calculated with respect to the axis may be made small, or when moved on the basis of operation force and force control gain, the value of the force control gain may be made small.

When the robot 50 is near the first singular configuration, the J2 axis 52 and the J3 axis 53, together with the J1 axis 51, are assumed to be operation axes whose positions are to be moved according to force. Regarding both of the J2 axis 52 and the J3 axis 53, the moving direction of the operation axes determined according to the direction of the force is assumed to be the same as the direction of the force.

This allows the robot to quickly pass through near the first singular configuration by applying a force to the tip 58 of the robot 50 to move the positions of both of the J2 axis 52 and the J3 axis 53 around the rotation center lines in the same direction, as described above.

Additionally, when moving the operation axes by using, as an operation force, the force applied around the rotation center lines of the operation axes, the J1 axis 51 may be moved by making the direction of the force applied to the tip 58 of the robot 50 parallel or nearly parallel to the rotation center lines of the J2 axis 52 and the J3 axis 53. In this case, the J1 axis 51 can be moved while making amounts of movement of the J2 axis 52 and the J3 axis 53 small.

In addition, when moving the axes by using, as an operation force, the force applied around the rotation center lines of the operation axes, the J2 axis 52 and the J3 axis 53 may be moved by making the direction of application of the operation force parallel or nearly parallel to the rotation center line of the J1 axis 51. In this case, an amount of movement of the J1 axis 51 can be made small. Additionally, the direction of the operation force may be obtained by comparison with a predetermined direction or the like on the basis of the direction of a force applied to the tip 58 of the robot 50 so that any axes other than a desired axis are not moved.

When the robot 50 is near the first singular configuration at the time of selecting a axis set as an operation axis from among the plurality of axes, the J2 axis 52 or the J3 axis 53 and a desired axis may be set as operation axes.

When moving both of the J2 axis 52 and the J3 axis 53 as operation axes, it can take time to cause the axes to pass through near the singular configuration depending on the setting of the operation axis setting unit 25, the direction of the force applied to the tip 58 of the robot 50, or the position of the tip 58 of the robot 50, since both axes are moved. In such a case, on the basis of an elapsed time and an amount of movement of the axes, one of the J2 axis 52 and the J3 axis 53 may not be set as an operation axis and may not be moved, or the moving direction of one or more operation axes determined according to the direction of force may be changed.

When both of the J2 axis 52 and the J3 axis 53 are moved as operation axes, these operation axes can move in directions different from each other depending on the direction of application of the force. Accordingly, when obtaining an operation force for moving the operation axes, it is preferable to obtain the direction of application of the operation force such that both axes move in the same direction.

In the second singular configuration depicted in FIG. 4, the axis that acts as the factor for being near the singular configuration or the axis that is caused to pass through near the singular configuration is the J3 axis 53. The J3 axis 53 is set as the operation axis to be moved according to force and moved. This allows the robot 50 to pass through near the second singular configuration.

When the rotation center lines of both of the J2 axis 52 and the J3 axis 53 of the robot 50 are parallel and oriented in the same direction in moving both of the J2 axis 52 and the J3 axis 53 as operation axes, the axes are moved in different rotation directions around the rotation center lines thereof. In this way, the J3 axis 53 is moved to allow the robot 50 to pass through near the second singular configuration, as well as the J2 axis 52 is moved in an opposite direction to allow the amounts of movement of the position of the origin of the J5 axis 55 and the position of the tip 58 of the robot 50 on the reference coordinate system to be small. As a result, operability of the robot 50 can be improved.

When each axis is moved near the singular configuration, a axis having a rotation center line orthogonal to the rotation center line of the J2 axis 52 or the J3 axis 53 may be adapted to be movable as an operation axis. In this case, the axis can be moved independently from the J2 axis 52 and the J3 axis 53.

When the J2 axis 52 or the J3 axis 53 is assumed to be the operation axis, there can be a axis that moves independently from the J2 axis 52 or the J3 axis 53 or moves simultaneously with the J2 axis 52 or the J3 axis 53 depending on the direction of the force applied to the tip 58 of the robot 50. The axis is preferably a axis that can be moved independently from the J2 axis 52 or the J3 axis 53. However, even when the axis moves simultaneously with J2 axis 52 or the J3 axis 53 depending on the direction of the force applied to the tip 58 of the robot 50, the axis may be set as the operation axis as long as there is no problem due to the motion. At this time, an operation force calculated with respect to the axis may be made small, or when moved on the basis of operation force and force control gain, the operation force and the value of the force control gain may be made small.

When the robot 50 is near the second singular configuration, the J2 axis 52 and the J3 axis 53, together with the J1 axis 51, are assumed to be operation axes whose positions are to be moved according to force. As for the moving directions of the operation axes determined according to the direction of the force, the moving direction of the J1 axis 52 is assumed to be a direction opposite to the direction of the force, whereas the moving direction of the J3 axis 53 is assumed to be the same as the direction of the force. Additionally, the setting of the moving direction of the J2 axis 52 determined according to the direction of the force may be changed as appropriate so that the J2 axis 52 is moved in the direction opposite to the moving direction of the J3 axis 53 when moving the J3 axis 53.

Additionally, when moving the operation axes by using, as an operation force, the force applied around the rotation center lines of the operation axes, the J1 axis 51 may be moved while making the direction of the force applied to the tip 58 of the robot 50 parallel or nearly parallel to the rotation center lines of the J2 axis 52 and the J3 axis 53. In this case, the J1 axis 51 can be moved while making the amounts of movement of the J2 axis 52 and the J3 axis 53 small.

Additionally, when moving the operation axes by using, as an operation force, the force applied around the rotation center lines of the operation axes, the J2 axis 52 and the J3 axis 53 may be moved while making the direction of application of the operation force parallel or nearly parallel to the rotation center line of the J1 axis 51. In this case, the amount of movement of the J1 axis 51 can be made small. In addition, the direction of the operation force may be obtained by comparison with a predetermined direction or the like on the basis of the direction of the force applied to the tip 58 of the robot 50 so that any axes other than a desired axis are not moved. In addition, when the robot 50 is near the first singular configuration at the time of selecting a axis set as an operation axis from among the plurality of axes, the J3 axis 53 and a desired axis may be set as operation axes.

In the third singular configuration depicted in FIG. 5, the axis that acts as the factor for being near the singular configuration or the axis that is caused to pass through near the singular configuration is the J5 axis 55. The J5 axis 55 is set as the operation axis to be moved according to force and moved. This allows the robot 50 to pass through near the third singular configuration.

When the J5 axis 55 is set as the operation axis, there can be a axis that moves independently from the J5 axis 55 or moves simultaneously with the J5 axis 55 depending on the direction of the force applied to the tip 58 of the robot 50. The axis is preferably a axis that can be moved independently from the J5 axis 55. However, even when the axis moves simultaneously with the J5 axis 55 depending on the direction of the force applied to the tip 58 of the robot 50, the axis may be set as the operation axis as long as there is no problem due to the motion. At this time, an operation force calculated with respect to the axis may be made small, or when moved on the basis of operation force and force control gain, the value of the force control gain may be made small.

When the robot 50 is near the third singular configuration, the J4 axis 54 and the J5 axis 55 are assumed to be operation axes whose positions are to be moved according to force. As for the moving directions of the operation axes determined according to the direction of the force, the moving direction of the J4 axis 52 is assumed to be the same as the direction of the force.

The moving direction of the operation axis determined according to the direction of the force of the J5 axis 55 is set on the basis of the moving direction of the J5 axis 55 and the direction of the force applied to the J5 axis 55 before or at the time when the robot 50 is near the singular configuration. Alternatively, when movement operation on the orthogonal coordinate system is performed before the robot 50 is near the singular configuration and where the movement operation is a translational operation, the moving direction of the operation axis is set to a direction opposite to the direction of the force. When the movement operation is a rotational operation, the moving direction of the operation axis is set to the same direction as that of the force. In this way, the direction of the movement operation on the orthogonal coordinate system before the robot 50 is near the singular configuration can be made the same as the moving direction of the operation axis determined according to the direction of the force, so that operability of the robot 50 can be improved.

In addition, when the robot 50 is near the third singular configuration at the time when selecting a axis set as an operation axis from among the plurality of axes, the J5 axis 55 and a desired axis may be set as operation axes.

The operation command unit 24 depicted in FIG. 2 outputs an operation command for moving the robot 50 by using an operation force calculated by the first force calculation unit 22 or the second force calculation unit 23 on the basis of the force measured by the force measurement unit 21 so that the robot 50 is moved on the basis of the force applied to the tip 58 of the robot 50.

The operation command unit 24 includes a first control mode and a second control mode for moving the robot 50. When the near-singular configuration determination unit 27 determines that the robot 50 is not near any singular configuration, the operation command unit 24 sets the control mode to the first control mode and moves the robot 50 on the basis of the first control mode. Meanwhile, when the near-singular configuration determination unit 27 determines that the robot 50 is near a singular configuration, the operation command unit 24 sets the control mode to the second control mode and moves the robot 50 on the basis of the second control mode.

In the first control mode, the operation command unit 24 causes the tool coordinate system to be translationally moved and rotationally moved around a control point as a rotation center point on the basis of an operation force calculated by the first force calculation unit 22 to obtain a moving direction and a moving velocity of the tip 58 of the robot 50 on the orthogonal coordinate system. Then, the operation command unit 24 outputs an operation command for moving the position and/or the posture of the tip 58 of the robot 50 on the orthogonal coordinate system at each control cycle. At this time, the command of the position and/or the posture of the tip 58 of the robot 50 on the orthogonal coordinate system is converted into a command of the position of each axis and then output. In addition, at this time, the moving speed with respect to the operation force may be determined by a force control gain. In addition, the moving velocity is preferably adjusted, as needed, by reducing responsiveness to the operation force and increasing or reducing the velocity depending on the situation in the movement operation.

In the second control mode, the operation command unit 24 obtains the moving direction and the moving velocity of the operation axis on the basis of the operation axis set by the operation axis setting unit 25, the moving direction of the operation axis determined according to the direction of the force, and the operation force with respect to the operation axis calculated by the second force calculation unit 23, and then outputs an operation command for moving the operation axis at each control cycle. When generating the operation command on the basis of the operation force, the moving velocity with respect to the operation force may be determined by a force control gain. In addition, the moving velocity is preferably adjusted, as needed, by reducing responsiveness to the operation force and increasing or reducing the velocity depending on the situation in the movement operation.

The storage unit 26 stores parameters necessary for various calculations and calculation results, such as a parameter that the force measurement unit 21 needs to calculate a force, a parameter that each of the first force calculation unit 22 and the second force calculation unit 23 needs to calculate an operation force, a parameter that the operation axis setting unit 25 needs to set an operation axis and a setting result, and a parameter that the near-singular configuration determination unit 27 or the axis position state determination unit 28 needs to perform determination and a determination result.

The display output unit 71 performs a display output as to which of the first control mode and the second control mode is set as the control mode. In addition, when the control mode is the second control mode, the display output unit 71 performs a display output of an operation axis set by the operation axis setting unit 25, a moving direction determined according to the direction of the force of the operation axis, and the like.

Furthermore, although not depicted in the drawing, the robot control device **10*a* includes a calculation unit for calculating the position of each axis of the robot 50, the position and/or the posture of the tip 58 of the robot 50, velocity, and acceleration on the basis of information from a position detection device such as an encoder attached to each axis of the robot 50**.

Furthermore, although not depicted in the drawing, the robot control device **10*a* includes an input unit that receives and processes input data such as data transferred by connecting an input device capable of inputting various settings to the robot control device 10*a* and data of settings input by another control device or a computer and transferred to the robot control device 10*a*** via a network.

Figure 6:
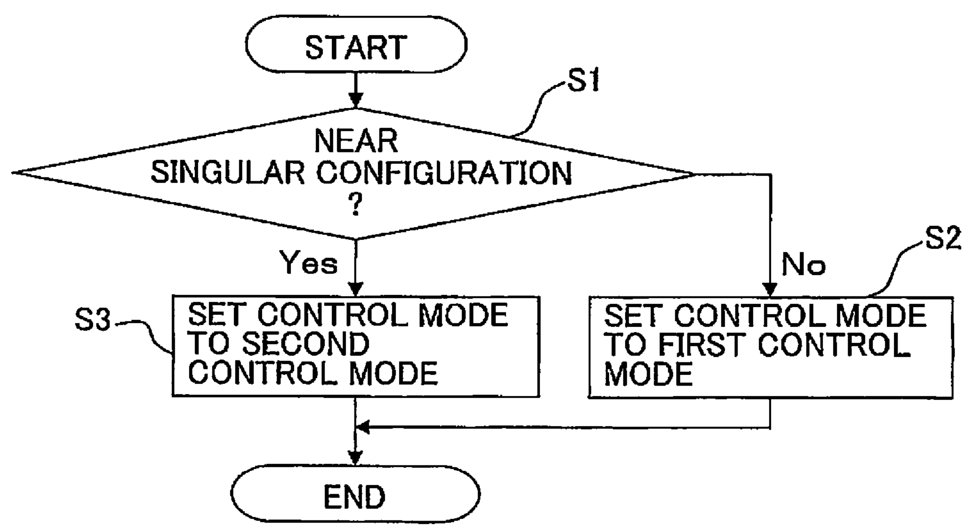
FIG. 6 is a flowchart depicting a process for processing by the robot control device according to the first embodiment of the invention.
Figure 7:
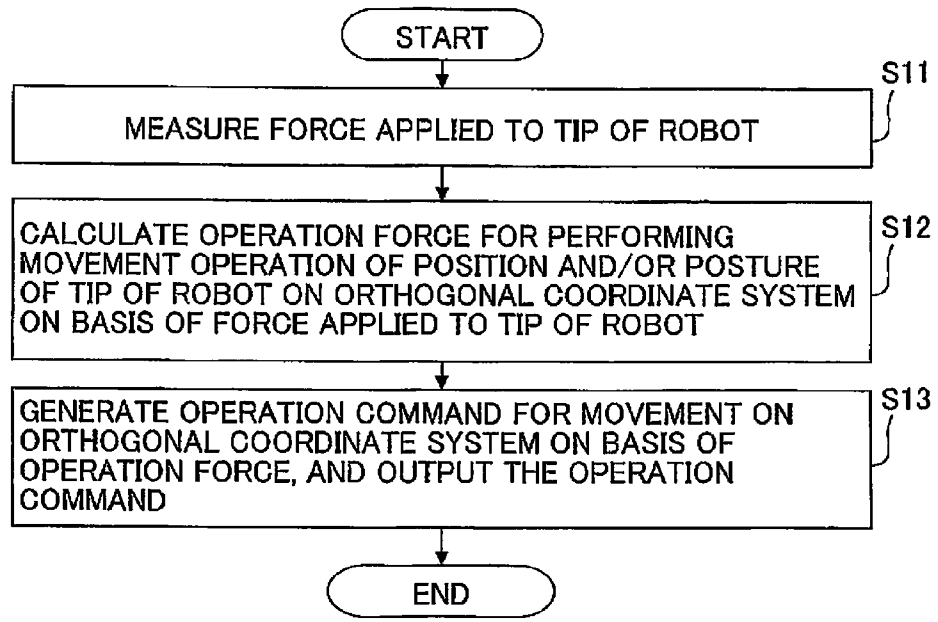
FIG. 7 is another flowchart depicting a process for processing by the robot control device according to the first embodiment of the invention.
Figure 8:
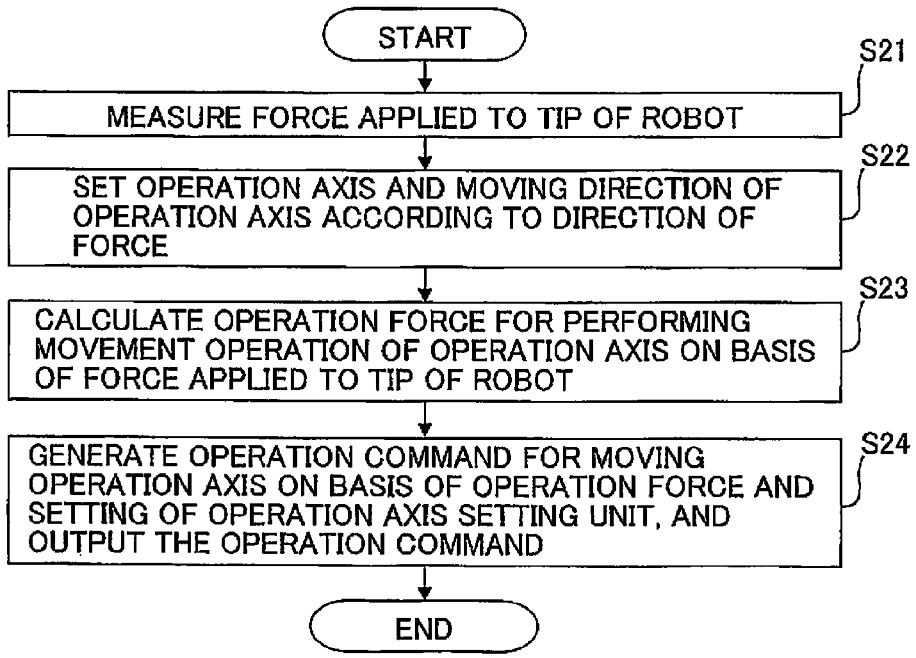
FIG. 8 is still another flowchart depicting a process for processing by the robot control device according to the first embodiment of the invention.

Next, with reference to each of FIGS. 6, 7, and 8, a description will be given of an example of a process for processing by the robot control device **10*a* according to the first embodiment when the operator 60 moves the robot 50 by applying a force to the tip 58 of the robot 50. FIGS. 6, 7, and 8 are flowcharts each of which depicts an example of the process for processing by the robot control device 10*a*. Hereinafter, with reference to the flowcharts of FIGS. 6, 7, and 8 and relevant drawings, a description will be given of execution processing by the robot control device 10*a* when moving the robot 50 by applying a force to the tip 58 of the robot 50**. It is to be noted that a series of processing described here is merely an example and the present invention is not limited to the specific example.

FIG. 6 is a diagram depicting an example of processing for setting the control mode. When the processing for moving the robot 50 starts, the near-singular configuration determination unit 27 determines whether or not the robot 50 is near a singular configuration (step S1). The near-singular configuration determination unit 27 determines whether to control the position and/or the posture of the tip 58 of the robot 50 on the orthogonal coordinate system at each control cycle (the first control mode) or to control the position of desired each axis at each control cycle (the second control mode).

When the near-singular configuration determination unit 27 determines that the robot 50 is not near the singular configuration, the control mode is set to the first control mode (step S2). In addition, when the near-singular configuration determination unit 27 determines that the robot 50 is near the singular configuration, the control mode is set to the second control mode (step S3).

In this way, the use of the near-singular configuration determination unit 27 allows switching between the first control mode that moves the position and/or the posture of the tip 58 of the robot 50 on the orthogonal coordinate system on the basis of the position of each axis of the robot 50 and the second control mode that moves the position of each axis, and also allows designation of a axis when operating each axis. Accordingly, while moving the tip 58 of the robot 50 by application of a force, the control mode can be switched without performing any input task by using a separately prepared input device.

In addition, while performing an operation of applying a force to the tip 58 of the robot 50, the position and/or the posture of the tip 58 thereof on the orthogonal coordinate system can be moved or desired each axis can be moved. For example, while moving the position and/or the posture of the tip 58 of the robot 50 on the orthogonal coordinate system by applying a force to the tip 58 thereof, desired each axis can be moved while applying the force to the tip 58 of the robot 50 to cause the robot 50 to pass through a position to which it cannot be moved by usual movement on the orthogonal coordinate system and then reach a position to which it cannot be usually moved from a certain position. After that, for example, movement on the orthogonal coordinate system can be performed again.

Thus, it is unnecessary to separately prepare any teaching device by which the operator switches the setting and perform any input operation for switching the setting. Accordingly, cost reduction in the robot system can be achieved, and in the movement operation, movement to an arbitrary position and/or an arbitrary posture on the orthogonal coordinate system and to an arbitrary axis position can be easily performed, as well as the movement operation can be performed more smoothly, continuously, and comfortably.

The present invention allows the robot 50 to pass through near a singular configuration where it is impossible or difficult to perform a movement operation of the position and/or the posture of the tip 58 of the robot 50 on the orthogonal coordinate system or the movement operation thereof becomes unstable, thus facilitating the movement operation in such a state. Furthermore, the robot 50 can also be stably and safely moved by early detecting a vicinity of the singular configuration where the movement operation of the position and/or the posture of the tip 58 thereof on the orthogonal coordinate system tends to be unstable and moving desired each axis.

Next, the operation command for moving the robot 50 is changed according to the control mode. FIG. 7 is a diagram depicting an example of processing executed when the control mode is the first control mode. Hereinafter, a description will be given of the processing executed when the control mode is the first control mode.

First, the force measurement unit 21 measures a force applied to the tip 58 of the robot 50 (step S11). Next, on the basis of the force applied to the tip 58 of the robot 50 measured by the force measurement unit 21, the first force calculation unit 22 calculates an operation force for moving the position and/or the posture of the tip 58 of the robot 50 on the orthogonal coordinate system (step S12).

Next, the operation command unit 24 generates an operation command for moving the position and/or the posture of the tip 58 of the robot 50 on the orthogonal coordinate system on the basis of the operation force calculated by the first force calculation unit 22, and outputs the operation command (step S13).

FIG. 8 is a diagram depicting an example of processing executed when the control mode is the second control mode. Hereinafter, a description will be given of the processing executed when the control mode is the second control mode. First, the force measurement unit 21 measures a force applied to the tip 58 of the robot 50 by the operator 60 (step S21). Next, the operation axis setting unit 25 sets an operation axis to be moved according to the force, and also sets a moving direction of the operation axis determined according to the direction of the force (step S22).

Then, on the basis of the force applied to the tip 58 of the robot 50 measured by the force measurement unit 21, the second force calculation unit 23 calculates an operation force for moving the position of the operation axis set by the operation axis setting unit 25 (step S23). Next, the operation command unit 24 generates an operation command for moving the position of the operation axis on the basis of the operation force calculated by the second force calculation unit 23 and the setting of the operation axis setting unit 25, and outputs the operation command (step S24).

Hereinafter, a further description will be given of a practical example of processing for moving the position of each axis executed when the control mode is the second control mode. In the step S22, the operation axis setting unit 25 sets the J2 axis 52, the J3 axis 53, and the J1 axis 51 as operation axes, on the basis of a current position of each axis. Then, the operation axis setting unit 25 is assumed to set the moving direction of the operation axis determined according to the direction of the force, for both of the J2 axis 52 and the J3 axis 53, to the same direction as that of the force.

Regarding such a case, a method for calculating an operation force for moving the position of the operation axis by the second force calculation unit 23 in the step S23 and a method for generating the operation command for moving the position of the operation axis by the operation command unit 24 in the step S24 will be described in detail below.

A description will be given of the method for calculating an operation force with respect to an operation axis by the second force calculation unit 23 when the robot 50 is near the first singular configuration depicted in FIG. 9. The calculation method may be changed when the axis set as the operation axis is different, and depending on the situation of the movement operation.

Figure 9:
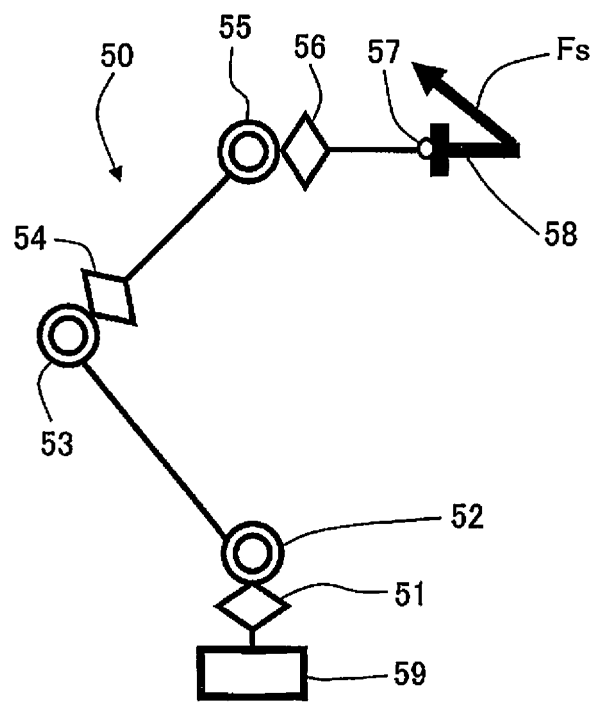
FIG. 9 is a diagram depicting a state where a force Fs is applied to a tip of the robot arm.

FIG. 9 is a diagram indicating that a force Fs applied to the tip 58 of the robot 50 has been measured by the force measurement unit 21. The Fs is assumed to include a translational component F of force and a moment component M of force and is assumed to be a force that includes translational components Fx, Fy, and Fx of force and moment components Mx, My, and Mz of force.

When setting a coordinate system with respect to an operation axis, the coordinate system is set in such a manner that a rotation center line of the operation axis is coincident with a Z axis of the coordinate system. The operation force may be a moment of a force around the Z axis in a force calculated by coordinate-converting the Fs measured by the force measurement unit 21 into a force on the coordinate system set at the operation axis.

Alternatively, the operation force may be obtained as below.

Figure 10:
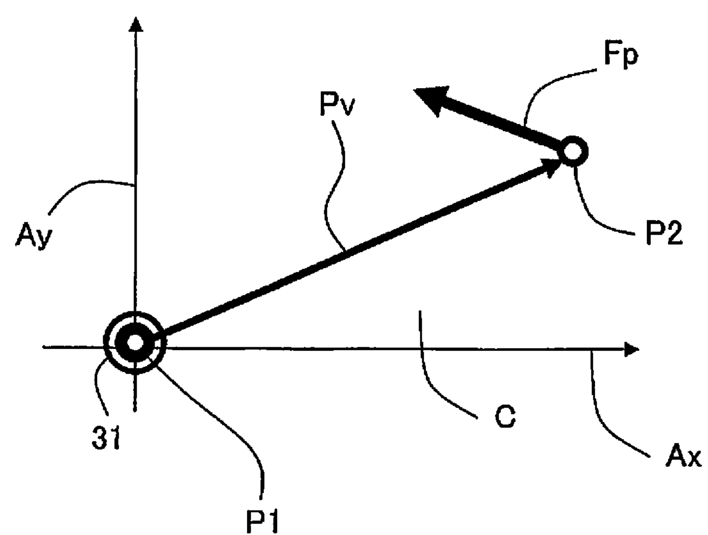
FIG. 10 is a diagram for illustrating a method for calculating an operation force with respect to an operation axis depicted in FIG. 9.

FIG. 10 is a diagram for illustrating a method for calculating an operation force with respect to an operation axis 31 on the basis of the operation axis 31 and the force Fs measured by the force measurement unit 21 depicted in FIG. 9.

A coordinate system including a point P1, an X axis Ax, a Y axis Ay, and a Z axis Az is set with respect to the operation axis 31 such that the P1 representing a position of the operation axis 31 on a reference coordinate system is the origin of the coordinate system; the Z axis Az is coincident with a rotation center line of the operation axis 31; and a plane formed by the X axis Ax and the Y axis Ay is a plane orthogonal to the rotation center line of the operation axis 31. A plane C is the plane formed by the X axis and the Y axis Ay on the coordinate system set with respect to the operation axis 31 and is assumed to be an X-Y plane. Additionally, the plane C may be a plane orthogonal to the rotation center line of the operation axis 31. In this case, the point P1 is an intersection point of the plane and the rotation center line. In addition, a point P2 is assumed to be a point where a force measurement point as the origin of a force measurement coordinate system used when measuring a force applied to the tip 58 of the robot 50 is projected on the plane C.

A moment of the force obtained by coordinate-converting the moment component force M (Mx, My, Mz) of the force Fs measured by the force measurement unit 21 into a moment of the force on the plane C is assumed to be a moment M21 of the force. Alternatively, the moment M21 of the force may be a moment of the force around the Z axis Az obtained by coordinate-converting the moment component force M thereof into a moment of the force on the coordinate system set at the operation axis 31:

A position vector Pv is a position vector from the P1 to the point P2 on the plane C. A magnitude of the position vector Pv in this case is a shortest distance between the rotation center line of the operation axis 31 and the force measurement point.

A force Fp is a translational force obtained as a force applied around the rotation center line of the operation axis 31 on the plane C on the basis of the translational component force F (Fx, Fy, Fz) of the force Fs measured by the force measurement unit 21. The translational force obtained by projecting the translational component force F on the place C may be assumed to be force Fp. In addition, when obtaining the force Fp on the basis of the translational component force F of the force Fs, the force Fp may be calculated on the basis of a direction in which the translational component force F of the force Fs is applied and a rotation operation of direction into a predetermined direction.

Figure 11:
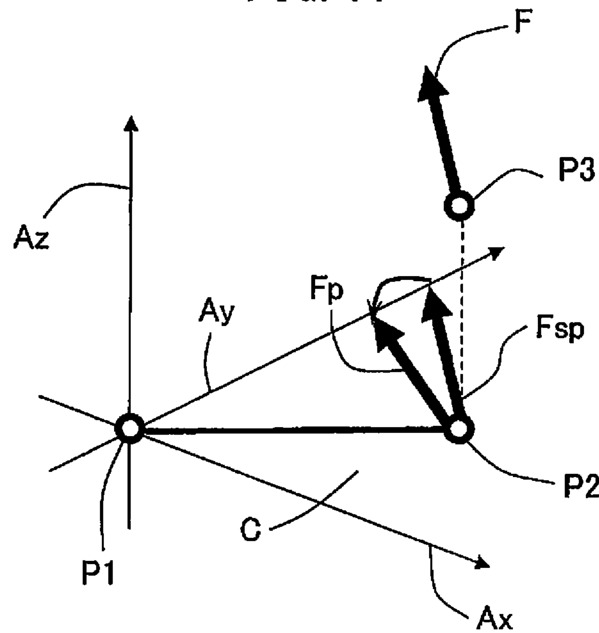
FIG. 11 is a diagram depicting an example of a method for calculating a force Fp.

Now, with reference to FIG. 11, a description will be given of an example of a method for calculating the force Fp for reducing fluctuation of the magnitude of the force Fp obtained by the force F due to fluctuation in the direction of the force F of the translational component of the force Fs. On the coordinate system at the operation axis 31, a force obtained by moving in parallel a force F applied at a force measurement point P3 so as to be applied at the point P2 on the plane C where a value of the force measurement point P3 in the Z axis Az direction is set to 0 is assumed to force Fsp. When an angle made by the force Fsp and the plane C is smaller than a predetermined threshold value, the force Fsp is rotated around the point P2 as a rotation center point in a direction closest to the plane C to use as a force on the plane C, thereby obtaining the force Fp.

When the angle made by the force Fsp and the plane C is large and the direction of the force Fsp is close to a direction orthogonal to the plane C, the above method inappropriately makes the force large and thus is not performed. When the angle made by the force Fsp and the plane C is equal to or larger than the predetermined threshold value, the force F of the transitional component of the force Fs or the force Fsp is projected on the plane C to obtain the force Fp, or alternatively, it is assumed that the magnitude of the force Fp is 0 and any operation force by the force F of the transitional component of the force Fs is not applied.

In addition, when an angle made by the force F of the transitional component of the force Fs and a plane parallel to the plane C is smaller than a predetermined threshold value, a vector obtained by projecting the force F on the place C and additionally performing expansion/contraction adjustment of a vector of the projection such that a magnitude of the vector becomes a magnitude of the force F may be assumed to be the force Fp.

Furthermore, when the angle made by the force F of the transitional component of the force Fs and the plane parallel to the plane C is equal to or larger than the predetermined threshold value, the force F may be projected on the plane C to obtain the force Fp, or alternatively, it may be assumed that the magnitude of the force Fp is 0 and any operation force by the force F of the transitional component of the force Fs is not applied.

As described above, it is possible to reduce fluctuation in the magnitude of the force Fp due to fluctuation in the direction of the force F or adjust the magnitude of the force Fp by obtaining the force Fp on the plane C on the basis of the direction in which the force F of the translational component of the force Fs is applied and the rotation operation of direction into a predetermined direction, as compared to when only projecting the force F on the plane C.

Additionally, with reference to FIG. 12, a description will be given of another example of the force Fp calculation method for reducing fluctuation of the magnitude of the force Fp obtained by the force F due to fluctuation in the direction of the force F of the translational direction component of the force Fs.

Figure 12:
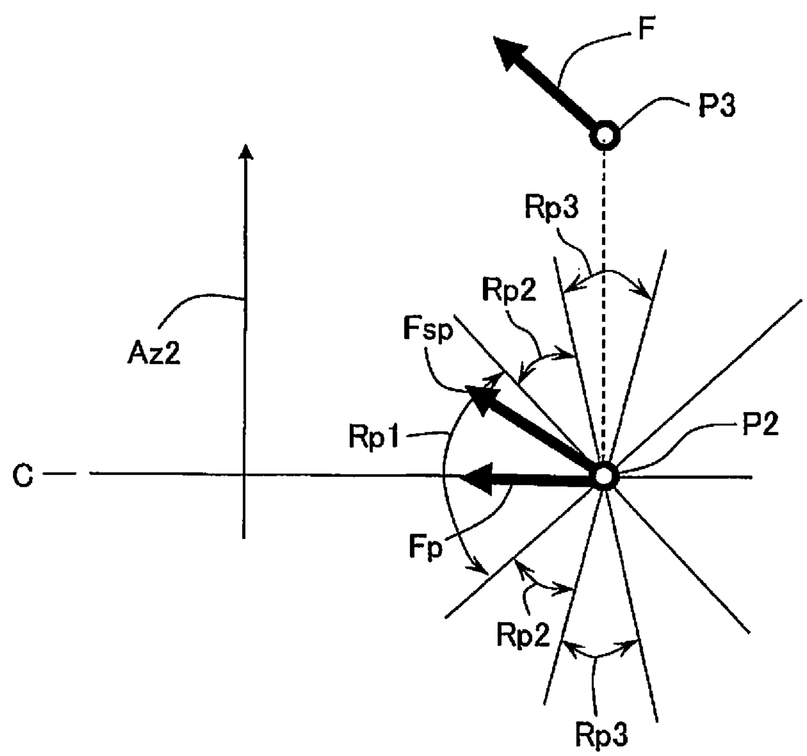
FIG. 12 is a diagram depicting another example of the method for calculating the force Fp.

A plane depicted in FIG. 12 indicates a plane including a vector obtained when a force F of a translational direction component of the Fs is projected on the plane C, orthogonal to the plane C, and including a axis Az2. The axis Az2 is assumed to be a axis parallel to the Z axis Az. The force Fsp is assumed to be a force moved in parallel on the coordinate system set with respect to the operation axis 31 such that the force F applied at the force measurement point P3 is applied at the point P2 on the plane C where the value of the force measurement point P3 in the Z axis Az direction is 0. An angle made by the force Fsp and the plane C is compared with predetermined ranges Rp1, Rp2, and Rp3 determined in order by a predetermined angle to obtain which of the predetermined ranges includes the direction of the force Fsp. Based on the range including the direction of the force Fsp, a predetermined angle set in each predetermined range is obtained to obtain a direction that forms the angle with respect to the plane C. In other words, a representative direction determined according to the direction of the force is obtained. Then, the Fsp is rotated around the point P2 as the rotation center point so that the direction of the force becomes the obtained direction. The force thus obtained is projected on the plane C, and the calculated vector is assumed to be a force Fp.

For example, when the direction of the force Fsp is within the range Rp1, a direction in which the force Fsp is rotationally moved is assumed to be a direction in which the angle made by the force Fsp and the plane C is 0 degrees.

When the direction of the force Fsp is within the range Rp3, the direction of the force Fsp is close to a direction orthogonal to the plane C. In such a case, the direction in which the force Fsp is rotationally moved is assumed to be a direction orthogonal to the plane C. Alternatively, it is assumed that the magnitude of the force Fp is 0 and any operation force by the force F of the translational direction component of the force Fs is not applied.

When switching the direction of the force Fsp depending on the predetermined range as mentioned above, it is preferable to smoothly change the direction of the force Fsp or the magnitude of the force Fp obtained by projecting the force Fsp so that the operation force does not significantly change.

With respect to the force Fp on the plane C thus obtained, a force Fn, as will be described later, obtained on the basis of a rotation operation of direction into a predetermined direction, a parallel movement operation, an operation of changing the magnitude of the force Fp, and the like, may be assumed to be a new force Fp.

Then, an operation force is obtained on the basis of a moment M11 of the force obtained by an outer product calculation of the force Fp on the plane C and the position vector Pv and a moment M21 of the force.

When the magnitude of the position vector Pv is smaller than a predetermined value, the moment of force M21 is assumed to be an operation force. This has the following effect. When the point P2 is close to the point P1, and, depending on an error of the point P2, the point P2 is in a different position from an actual position thereof or the position thereof fluctuates, the sign of the moment of force can be opposite. In such a case, when the value of a force control gain with respect to the operation force is large or when a moment of force is calculated by multiplying each of the moment of force M11 and the moment of force M21 by a coefficient and adding them together, and when the coefficient by which the moment of force M11 is multiplied is large, it can be prevented that the operation axis is moved in an unintentional direction.

When the magnitude of the position vector Pv is equal to or larger than the predetermined value, a moment of force is calculated from the outer product calculation of the position vector Pv and the force Fp, and the calculated moment of force M11 is assumed to be an operation force. Alternatively, a moment of force obtained by adding the calculated moment of force M11 and the moment of force M21 together is assumed to be an operation force. Furthermore, values obtained by multiplying each of the moments of force M11 and M21 by a coefficient to change the magnitude thereof to adjust an influence of each moment of force may be added together. In this case, the coefficient may be adjusted on the basis of the magnitude of the position vector Pv, the magnitude of the force Fp, and the like.

When it is desirable to remove the influence of the force M of the moment component of force of the force Fs measured by the force measurement unit 21 or it is desirable to move the operation axis only by the translational force of the force Fs, only the moment of force M11 is preferably assumed to be the operation force, without considering the moment of force M21.

Additionally, even if the magnitude of the force Fp is the same, the magnitude of the calculated moment of force M11 varies depending on the magnitude of the position vector Pv. For this reason, unlike the moment of force M21, the magnitude of the moment of force M11 varies depending on the positional movement of the tip 58 of the robot 50, and thus the operation force fluctuates.

Accordingly, when the magnitude of the position vector Pv is equal to or larger than the predetermined threshold value and the magnitude of the force Fp is smaller than a predetermined threshold, only the moment of force M21 may preferably be assumed to be the operation force. The description regarding the moment of force M21 hereinabove will be similarly applied to other cases when considering the moment of force M21.

When calculating a moment of force as described above, even if the magnitude of the force Fp is the same, there is a problem resulting from change in the magnitude of the calculated moment of force M11 caused depending on the magnitude of the position vector Pv. A method for solving the problem will be described with reference to FIG. 13.

Figure 13:
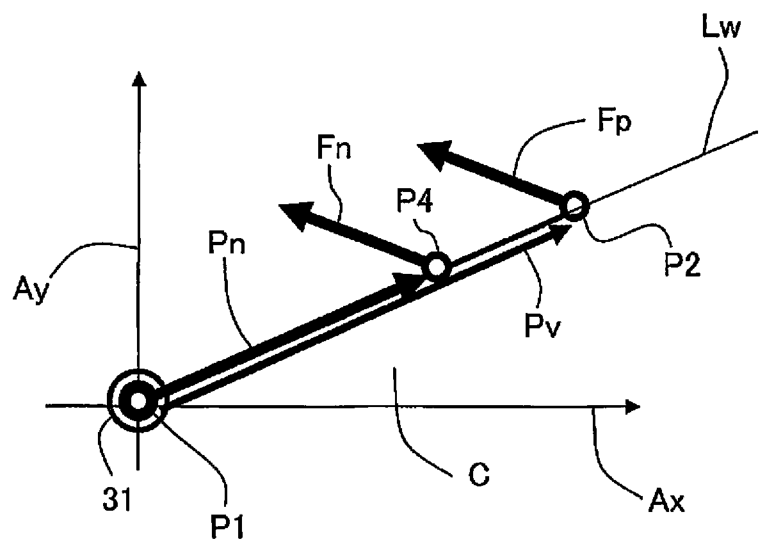
FIG. 13 is a diagram for illustrating a method for calculating an operation force with respect to the operation axis.

FIG. 13 is a diagram for illustrating another method for calculating an operation force with respect to the operation axis 31 on the basis of the force Fs measured by the force measurement unit 21 described as above. A straight line Lw is assumed to be a straight line present on the plane C and including the point P1 and the point P2. A position vector Pn is calculated by an expansion/contraction adjustment of the magnitude of the position vector Pv to a predetermined value Cpn on the basis of the position vector Pv where the force Fp including a translational force on the place C is applied. A force obtained by moving the force Fp in parallel so as to be applied at a position P4 as an end point of the position vector Pn is assumed to be a force Fn.

A moment of force is calculated from an outer product calculation of the position vector Pn and the force Fn thus obtained, and the calculated moment of force M12 is assumed to be the operation force.

As described above, when obtaining a moment of force, the expansion/contraction adjustment of the position vector allows the reduction of fluctuation in the moment of force due to fluctuation in the position of the point P2, so that small fluctuation, radical change, and the like in the operation force can be prevented. Thus, the robot 50 can be stably moved and therefore operability can be improved.

In addition, when obtaining a moving velocity of the operation axis on the basis of an operation force and a force control gain, it can be prevented that even if the same force is applied, the moving velocity of the operation axis unintentionally varies depending on the position of the tip 58 of the robot 50.

In addition, in FIG. 13, the predetermined value Cpn used for setting the magnitude of the position vector Pv to a predetermined magnitude may be changed on the basis of the magnitude of the position vector Pv. Specifically, the predetermined value Cpn is changed with respect to the magnitude of the position vector Pv in stages in each predetermined range. In this case, when switching the value in stages, it is preferable to smoothly change the predetermined value Cpn or smoothly change the calculated moment of force M12 in such a manner that the operation force does not significantly change.

As described above, since the predetermined value Cpn is changed in stages in each predetermined range, it can be prevented that the moment of force fluctuates due to a small positional fluctuation within the predetermined range. This allows the moment of force M12 to change according to the magnitude of the position vector Pv even when the magnitude of the force Fn is the same. Furthermore, fluctuation in the operation force can be reduced, which allows the robot 50 to be moved more stably and more safely, thereby improving operability.

Alternatively, as the magnitude of the position vector Pv becomes larger, the predetermined value Cpn may be made smaller. In this case, as the magnitude of the position vector Pv increases, the predetermined value Cpn is reduced in stages in each predetermined range or in stages according to a predetermined function. At this time, when switching the predetermined value Cpn in stages, it is preferable to smoothly change the value of the predetermined value Cpn in such a manner that the operation force does not significantly change.

As described above, making the predetermined value Cpn smaller along with the increase of the magnitude of the position vector Pv allows the magnitude of the moment of force M12 to be made small even when the magnitude of the force Fn is the same, whereby the operation force can be made small. In this way, when obtaining the moving velocity of the operation axis on the basis of operation force and force control gain, the moving velocity of the operation axis can be made small when the magnitude of the force Fp is the same but the tip 58 of the robot 50 is distal from the operation axis. The operator can move the robot 50 more safely by moving the tip 58 of the robot 50 in a state where the moving velocity, i.e., a rotation velocity of the axis is made small.

Furthermore, as in the above description given with reference to FIG. 10, the moment of force M21 may be calculated for use. In other words, when the magnitude of the position vector Pv is smaller than the predetermined value, the moment of force M21 is assumed to be the operation force. In addition, when the magnitude of the position vector Pv is equal to or larger than the predetermined value, the moment of force M12 or a moment of force obtained by adding the moment of force M12 and the moment of force M21 together is assumed to be the operation force. Furthermore, an influence of each of the moments of force M12 and M21 may be adjusted by multiplying each of the moment of force M12 and the moment of force M21 by a coefficient to change the magnitude thereof, and then values obtained by the adjustment of the influences may be added together. In this case, the coefficient may be adjusted on the basis of the magnitude of the position vector Pv, the magnitude of the force Fp, and the like.

Additionally, when calculating a moment of force as described above, there is a problem resulting from change in the magnitude of the calculated moment of force caused depending on the direction of the force Fp even when the magnitude of the force Fp is the same. A method for solving the problem will be described with reference to FIG. 14.

Figure 14:
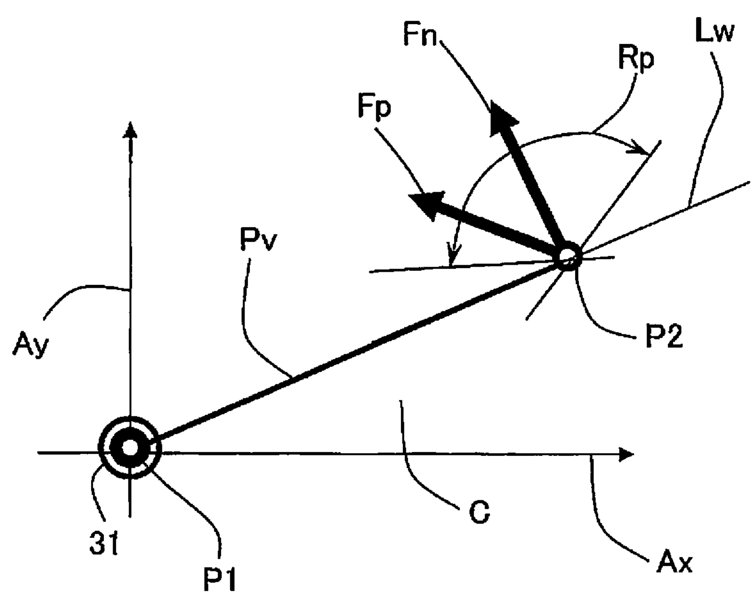
FIG. 14 is a diagram for illustrating another method for calculating an operation force with respect to the operation axis.

FIG. 14 is a diagram for illustrating another method for calculating an operation force with respect to the operation axis 31 on the basis of the force Fs measured by the force measurement unit 21 described as above. In FIG. 14, there is obtained a force including a translational force applied around the rotation center line of the operation axis 31 on the basis of a direction in which a force F of a translational component of a force Fs is applied and a rotation operation of direction into a predetermined direction.

First, as described above, on the basis of the force F of the translational component of the force Fs, a force Fp including a translational force on the plane C is calculated. On the basis of a direction of the calculated force Fp, there is obtained an angle made by the force Fp and the straight line Lw. The calculated angle is compared with a predetermined angle range Rp. When it is determined that the direction of the force Fp is within the predetermined angle range Rp, the force Fp is rotated around the point P2 as a rotation center point so that the direction of the force Fp is a predetermined direction Dn (not depicted in the drawing) as a representative direction, thereby calculating a force Fn. The direction of the force Fn is preferably set to a direction orthogonal to the position vector Pv. A moment of force is calculated from an outer product calculation of the position vector Pn and the force Fn thus obtained, and the calculated moment of force M13 is assumed to be the operation force.

As described above, when obtaining a moment of force, setting the direction of the force Fp applied around the rotation center line of the operation axis 31 to a representative direction determined according to the direction can reduce fluctuation in the moment of force due to fluctuation in the direction of the force Fp, so that fluctuation and radical change in the operation force, and the like can be prevented. Thus, the robot 50 can be stably moved, thereby allowing improvement in operability.

In addition, when obtaining the moving velocity of the operation axis on the basis of operation force and force control gain, it can be prevented that even if the same force is applied, the moving velocity of the operation axis unintentionally varies depending on the direction of the force Fp.

Additionally, the predetermined direction Dn used to rotate the direction of the force Fp may be changed according to the direction of the force Fp. A description will be given of an example of a method for rotating the direction of the force Fp by changing the predetermined direction Dn according to the direction of the force Fp, with reference to FIG. 15.

Figure 15:
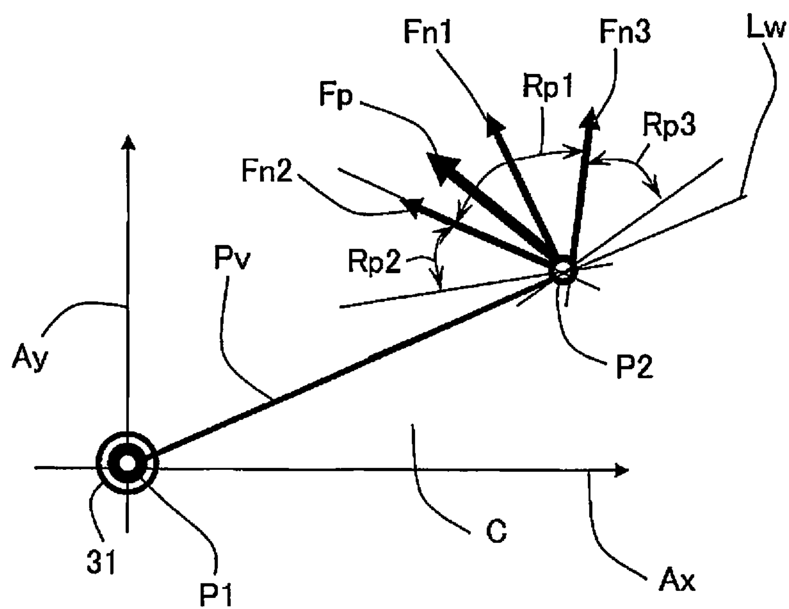
FIG. 15 is a diagram depicting an example of a method for rotating a direction of the force Fp.

As depicted in FIG. 15, ranges different in order, such as ranges Rp1, Rp2, and Rp3, are set as predetermined angular ranges. On the basis of an angle made by the force Fp and the straight line Lw, it is determined which of the angular ranges Rp1, Rp2, and Rp3 includes the direction of the force Fp. On the basis of the predetermined direction Dn set in advance in each range, the direction of the force Fp is rotated around the point P2 as the rotation center point.

For example, when the direction of the force Fp is within the range Rp1, a force Fn1 obtained by rotating the force Fp in the predetermined direction Dn is assumed to be force Fn. When the direction of the force Fp is within the range Rp2, a force Fn2 obtained by rotating the force Fp in another predetermined direction Dn is assumed to be force Fn. Furthermore, when the direction of the force Fp is within the range Rp3, a force Fn3 obtained by rotating the force Fp in still another predetermined direction Dn is assumed to be force Fn. When switching the predetermined direction Dn in stages in each range as described above, it is preferable to smoothly change the direction of the force Fp or smoothly change the calculated moment of force M13 so that the operation force does not significantly change.

In this way, changing the predetermined direction Dn used to rotate the direction of the force Fp in stages in each predetermined range on the basis of the direction of the force Fp allows the moment of force M13 to be changed considering the direction of the force Fp as much as possible. Furthermore, in this case, it is possible to prevent small fluctuation in the moment of force M13 due to fluctuation in the direction of the force Fp occurring when the direction of the force Fp is within any of the predetermined ranges. This can reduce fluctuation in the operation force, so that the robot 50 can be moved more stably and safely to allow improvement in operability.

Additionally, as the magnitude of the position vector Pv becomes larger, the predetermined direction Dn may be changed to a direction in which the angle made by the predetermined direction Dn and the position vector Pv becomes smaller. In this case, along with the increase of the magnitude of the position vector Pv, the predetermined direction Dn is changed to the direction in which the angle made by the predetermined direction Dn and the position vector Pv becomes smaller with respect to the magnitude of the position vector Pv in stages in each predetermined range or in stages according to a predetermined function.

When switching the predetermined direction Dn in stages in each range, it is preferable to smoothly change the direction of the force Fp or smoothly change the calculated moment of force M13 so that operation force does not significantly change.

Thus, the operation force can be made small by reducing the magnitude of the moment of force M13 even when the magnitude of the force Fn is the same, by changing the predetermined direction Dn to the direction in which the angle made by the predetermined direction Dn and the position vector Pv becomes smaller as the magnitude of the position vector Pv becomes larger.

Accordingly, when obtaining the moving velocity of the operation axis on the basis of operation force and force control gain, the moving velocity of the operation axis can be made small when the tip 58 of the robot 50 is distal from the operation axis even though the magnitude of the force Fp is the same. By moving the tip 58 of the robot 50 in the state where the moving velocity, i.e., the rotation velocity of the axis is made small, the operator can move the robot 50 more safely.

Furthermore, as in the above description with reference to FIG. 10, the moment of force M21 may be calculated for use. In other words, when the magnitude of the position vector Pv is smaller than a predetermined value, the moment of force M21 is assumed to be the operation force. In addition, when the magnitude of the position vector Pv is equal to or larger than the predetermined value, the moment of force M13 or a moment of force obtained by adding the moment of force M13 and the moment of force M21 together is assumed to be the operation force. Furthermore, an influence of each of the moment of force M13 and the moment of force M21 may be adjusted by multiplying the each moment of force by a coefficient to change the magnitude of each thereof, and values obtained by the adjustment of the influence may be added together. In this case, the coefficient may be adjusted on the basis of the magnitude of the position vector Pv, the magnitude of the force Fp, and the like.

In addition, a moment of force may be calculated on the basis of the operation of adjusting expansion/contraction of the position vector where the force Fp on the plane C is applied performed upon calculation of the moment of force M12 and the rotation operations into the direction of the force F of the translational component of the force Fs and the predetermined direction performed upon calculation of the moment of force M12.

A description will be given of a practical example of the calculation method with reference to FIG. 16.

Figure 16:
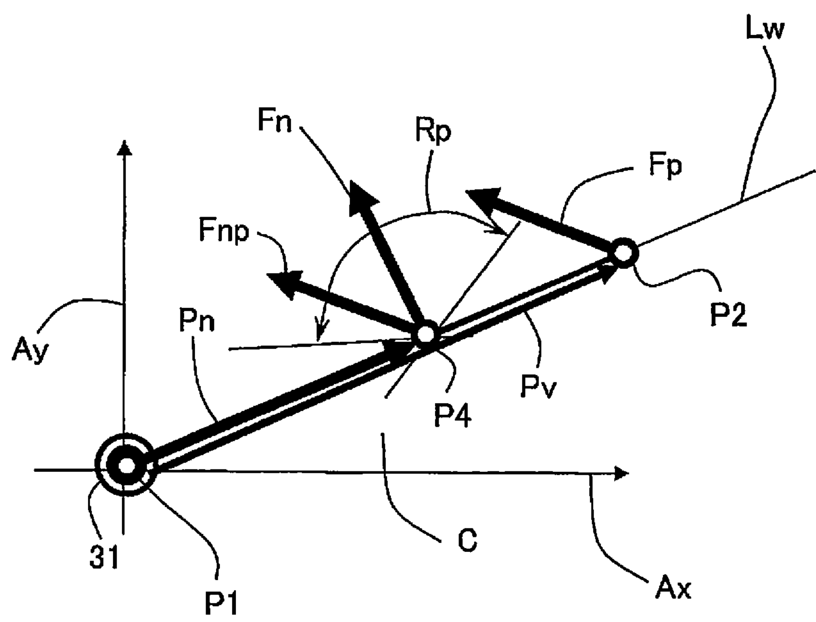
FIG. 16 is a diagram for illustrating still another method for calculating an operation force with respect to the operation axis.

FIG. 16 is a diagram for illustrating a method for calculating an operation force with respect to the operation axis 31 on the basis of the force Fs measured by the force measurement unit 21, as in FIGS. 10, 13, 14, and 15, and the like.

Similarly to the above description, the point P1 is the origin representing the position of the operation axis 31 on the reference coordinate system. The plane C is assumed to be an X-Y plane, which is a plane formed by the X axis Ax and the Y axis Ay on a coordinate system set at the operation axis 31 such that the origin is positioned at the point P1, the Z axis Az is coincident with the rotation center line of the operation axis 31, and the plane formed by the X axis Ax and the Y axis Ay is a plane orthogonal to the rotation center line of the operation axis 31. The point P2 is assumed to be a point where a force measurement point as an origin of a force measurement coordinate system when measuring a force applied to the tip 58 of the robot 50 is projected on the plane C. The position vector Pv is assumed to be a position vector from the point P1 to the point p2 on the plane C. The force Fp is assumed to be a translational force obtained as a force applied around the rotation center line of the operation axis 31 on the plane C as described above, on the basis of the force F of the translational component of the force Fs. Reference sign Lw is assumed to be a straight line present on the plane C and including the points P1 and P2.

In this case, on the basis of the position vector Pv where the force Fp including the translational force is applied, a position vector Pn is calculated by an expansion/contraction adjustment of the magnitude of the position vector Pv to a predetermined value Cpn. A force obtained by moving the force Fp in parallel such that a point where the force Fp including the translational force is applied is moved to the position P4 as the end point of the position vector Pn is assumed to be a force Fnp.

On the basis of the direction of the force Fnp obtained by moving the force Fp in parallel on the plane C, an angle made by the force Fnp and the straight line Lw is calculated. The calculated angle is compared with the predetermined angular range Rp given by a predetermined angle. When it is determined that the direction of the force Fp is within the predetermined angular range Rp, the force Fn obtained by rotating the direction of the force Fp in a predetermined direction is calculated.

A moment of force is calculated from an outer production calculation of the position vector Pn and the force Fn thus obtained, and the calculated moment of force M14 is assumed to be the operation force. However, when the magnitude of the position vector Pv is smaller than a predetermined value, the moment of force M21 is assumed to be the operation force, as in the above description.

As described above, the direction of the force Fp applied around the rotation center line of the operation axis 31 is set to a representative direction determined according to the direction. Additionally, the magnitude of the position vector where the force is applied is set to a predetermined magnitude. This can reduce fluctuation in the moment of force due to fluctuation in the position of the point P2 and fluctuation in the direction of the force Fp when obtaining a moment of force. Thus, small fluctuation, radical change, and the like in the operation force can be prevented. Accordingly, the robot 50 can be stably moved, thereby allowing improvement in operability.

Additionally, when obtaining the moving velocity of the operation axis on the basis of operation force and force control gain, it can be prevented that even with application of a force with the same magnitude, the moving velocity of the operation axis unintentionally changes depending on the direction of the force Fp.

In addition, change in the direction of the force Fp, another practical example of the method for setting the magnitude of the position vector where the force Fp is applied to a predetermined value, a method for considering the moment of force M21, and the like are the same as those in the above description. Use of those methods allows improvement in operability for moving the robot 50 by applying a force and allows safer movement of the robot 50.

Another practical example of the operation force calculation method will be described below.

On the basis of the force F of the translational component of the force Fs measured by the force measurement unit 21, there is obtained the force Fp including a translational force applied around the rotation center line of the operation axis 31, and on the basis of a direction of the force Fp including the translational force, there is obtained the direction of the operation force. Alternatively, the magnitude of the operation force may be obtained on the basis of the magnitude of the force F of the translational component of the force Fs measured by the force measurement unit 21 or the magnitude of the force Fp applied around the rotation center line of the operation axis 31.

Figure 17:
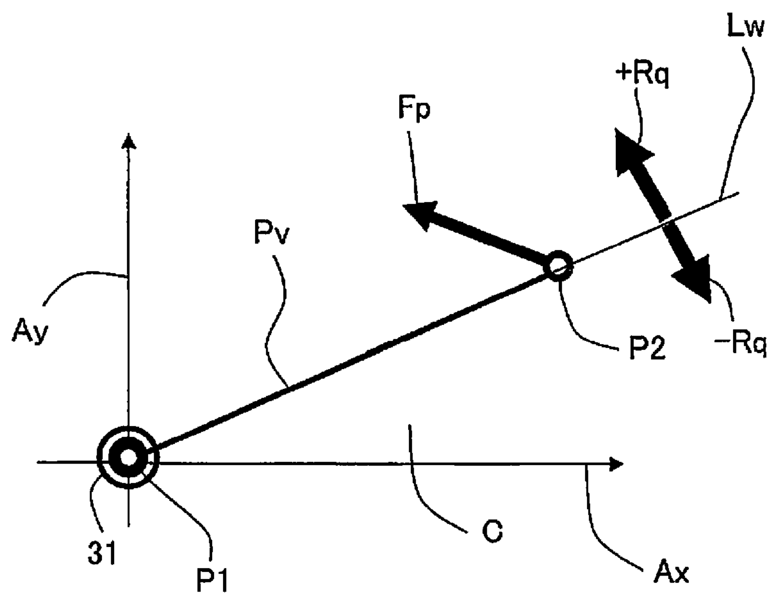
FIG. 17 is a diagram for illustrating still another method for calculating an operation force with respect to the operation axis.

The above practical example will be further described with reference to FIG. 17.

Similarly to the above-described practical example, the point P1 is assumed to be the origin representing the position of the operation axis 31 on the reference coordinate system. The plane C is assumed to be an X-Y plane, which is a plane formed by the X axis Ax and the Y axis Ay on the coordinate system set at the operation axis 31 such that the origin is positioned at the point P1, the Z axis Az is coincident with the rotation center line of the operation axis 31, and the plane formed by the X axis Ax and the Y axis Ay is a plane orthogonal to the rotation center line of the operation axis 31. The point P2 is assumed to be a point wherein a force measurement point as an origin of a force measurement coordinate system when measuring a force applied to the tip 58 of the robot 50 is projected on the plane C. The position vector Pv is assumed to be a position vector from the point P1 to the point P2 on the plane C. The force Fp is assumed to be a translational force obtained as a force applied around the rotation center line of the operation axis 31 on the plane C as described above, on the basis of the force F of the translational component of the force Fs. Reference sign Lw is assumed to be a straight line present on the plane C and including the points P1 and P2.

When the magnitude of the position vector Pv is smaller than a predetermined value, the operation force is assumed not to be applied. Then, when the magnitude of the position vector Pv is equal to or larger than the predetermined value, processing will be performed as follows.

First, on the basis of the force Fp, a virtual force assumed to be virtually applied to the operation axis 31 is obtained as follows. For example, by obtaining an inner product of a vector of the force Fp and the position vector Pv, a direction of the virtual force is obtained to determine a sign of the virtual force depending on whether the direction of the force Fp is a positive direction orthogonal to the straight line Lw (a +Rq direction) or a negative direction orthogonal to the straight line Lw (a −Rq direction). In the case depicted in FIG. 17, it is obtained that the direction of the force Fp is the positive direction orthogonal to the straight line Lw (+Rq direction). Accordingly, on the basis of the obtained direction, the direction of the virtual force is assumed to be the positive direction, and the sign of the virtual force is assumed to be positive.

Furthermore, on the basis of the magnitude of the force Fp, or the magnitude of the force F of the translational component of the force Fs is assumed to be the magnitude of the virtual force. Alternatively, a magnitude of a component orthogonal to the position vector Pv of the force Fp may be assumed to be the magnitude of the virtual force. A virtual force Fk thus obtained is assumed to be the operation force.

Furthermore, the moment of force M21 obtained on the basis of the force M of the moment component of the force Fs measured by the force measurement unit 21 may be calculated for use. When the magnitude of the position vector Pv is smaller than the predetermined value, the moment of force M21 is assumed to be the operation force.

In addition, when the magnitude of the position vector Pv is equal to or larger than the predetermined value, a value obtained by multiplying the virtual force Fk by a predetermined value or a moment of force obtained by adding the value obtained by multiplying the virtual force Fk by the predetermined value and the moment of force M21 together is assumed to be the operation force. Furthermore, each of the value obtained by multiplying the virtual force Fk by the predetermined value and the moment of force M21 may be multiplied by a coefficient to change the magnitudes thereof so as to adjust an influence of each thereof. Then, values obtained by the adjustment may be added together. In this case, the coefficient may be adjusted on the basis of the magnitude of the position vector Pv, the magnitude of the force Fp, and the like.

As in the above description, when it is desirable to remove the influence of the force M of a moment component of the force Fs measured by the force measurement unit 21 or it is desirable to move the operation axis only by the translational force of the force Fs, a force based on the virtual force Fk is preferably assumed to be the operation force, without considering the moment of force M21.

The operation command unit 24 moves the operation axis on the basis of the operation force obtained as described above and the moving direction determined according to the direction of the force set by the operation axis setting unit 25. At this time, the operation command unit 24 determines a target moving direction of the operation axis (a rotation direction when the operation axis is a rotation axis), on the basis of a moving direction of the operation force determined according to the sign of the operation force and the direction of the force set by the operation axis setting unit 25, which is here determined according to the sign of the operation force, and calculates a target moving velocity of the operation axis on the basis of the magnitude of the operation force.

In this case, it is preferable to calculate the target moving velocity of the operation axis by performing a force control obtained by multiplying the magnitude of the operation force by a force control gain for determining a movement responsiveness to force. In addition, the force control gain may be changed according to a shortest distance from the rotation center line of the operation axis to the tip 58 of the robot 50.

At this time, the force control gain is changed on the basis of the shortest distance from the rotation center line of the operation axis to the tip 58 of the robot 50, in stages in each predetermined range, in stages according to a predetermined function, or continuously according to the predetermined function. When switching the force control gain in stages, it is preferable to smoothly change the velocity of movement so that the moving velocity of the robot 50 does not suddenly and significantly change.

In this way, responsiveness to the operation force can be changed depending on the position of the tip 58 of the robot 50, whereby the moving velocity of the robot 50 can be adjusted in each region in the space.

Now, consideration will be given to movement of the operation axis at a same angular velocity with respect to a same operation force in situations where the shortest distance from the rotation center line of the operation axis to the tip 58 of the robot 50 is large and where it is small. When the shortest distance is large, the translational velocity of the tip 58 of the robot 50 becomes larger than when the shortest distance is small.

Then, when the position of the tip 58 of the robot 50 is distal from the operation axis, it is safer and easier in operation to make smaller the angular velocity of the operation axis with respect to the operation force than when the position of the tip 58 thereof is close to the operation axis. Accordingly, as the shortest distance from the rotation center line of the operation axis to the tip 58 of the robot 50 becomes larger, the force control gain may be made smaller.

In this way, even when the magnitude of the operation force is the same, the velocity of the tip 58 of the robot 50 can be made smaller as the position of the tip 58 of the robot 50 becomes more distant from the operation axis. As a result, safety of the robot 50 can be increased and operability can be improved.

Additionally, when changing the target moving velocity of the operation axis according to the magnitude of the operation force, even if the magnitude of the operation force is the same, a tangential velocity of the tip 58 of the robot 50 becomes larger as the tip 58 of the robot 50 becomes more distant from the operation axis.

Then, when the operation command unit 24 moves the operation axis on the basis of the operation force obtained as described above and the moving direction determined according to the direction of the force set by the operation axis setting unit 25, the operation command unit 24 obtains, on the basis of the operation force, a target moving direction and a target tangential velocity of the tip 58 of the robot 50 around the rotation center line of the operation axis. Then, the operation command unit 24 may obtain a target moving direction and a target moving velocity of the operation axis on the basis of the target moving direction and the target tangential velocity of the tip 58 of the robot 50 to move the operation axis.

In this way, when the magnitude of the operation force is the same, the tangential velocity of the tip 58 of the robot 50 can be made the same, regardless of the position of the tip 58 thereof. In this case, even when the magnitude of the operation force is the same, the rotation velocity of the operation axis becomes smaller as the tip 58 of the robot 50 becomes more distant from the operation axis.

Additionally, in order to obtain such an effect, when calculating the target moving velocity of the operation axis on the basis of the magnitude of the operation force, the force control gain may be made smaller as the shortest distance from the rotation center line of the operation axis to the tip 58 of the robot 50 becomes larger, as described above. In addition, in order to obtain the above-described effect, when calculating the operation force, reduction calculation may be made by using the shortest distance from the rotation center line of the operation axis to the tip 58 of the robot 50 so that the obtained operation force may be small.

In addition, when obtaining the target moving direction and the target moving velocity of the operation axis after obtaining the moving direction and the tangential velocity of the tip 58 of the robot 50 around the rotation center line of the operation axis on the basis of the operation force, the target tangential velocity of the tip 58 of the robot 50 may be calculated by a force control obtained by multiplying the magnitude of the operation force by a force control gain for determining a movement responsiveness to force. Even in this case, the value of the force control gain may be changed according to the shortest distance from the rotation center line of the operation axis to the tip 58 of the robot 50.

In such a case, the force control gain is changed on the basis of the shortest distance from the rotation center line of the operation axis to the tip 58 of the robot 50, in stages in each predetermined range, in stages according to a predetermined function, or continuously according to the predetermined function. When switching the force control gain in stages, it is preferable to smoothly change the velocity of movement so that the moving velocity of the robot 50 does not suddenly and significantly change.

Additionally, in the above-described case, the force control gain may be made smaller as the shortest distance from the rotation center line of the operation axis to the tip 58 of the robot 50 becomes larger. In this way, as the position of the tip 58 of the robot 50 becomes more distant from the rotation center line of the operation axis, the tangential velocity of the tip 58 of the robot 50 around the rotation center line of the operation axis can be made smaller, as a result of which the robot 50 can be operated more safely.

Thus, the operation command unit 24 outputs a command for moving a desired axis set as the operation axis of the robot 50, on the basis of the setting of the operation axis setting unit 25 and the operation force(s) calculated by the first operation force acquisition unit 22 and/or the second operation force acquisition unit 23.

In the robot control device 10*a* that realizes the robot control device 10 according to the first embodiment of the present invention, when moving the robot 50 by applying a force to the tip 58 of the robot 50, the position of each axis of the robot 50 is moved near a singular configuration where the position and/or the posture of the tip 58 of the robot 50 on the orthogonal coordinate system are/is moved. Additionally, the near-singular configuration determination unit 27 is used to determine whether to perform a control of the position and/or the posture of the tip 58 of the robot 50 at each control cycle or whether to perform a control of the position of desired each axis of the robot 50 at each control cycle, so as to switch the control mode. As a result, the invention provides advantageous effects as follows.

When the robot 50 is near a singular configuration, the following state exists: a state where the robot 50 cannot be moved by any usual operation on the orthogonal coordinate system, a state where control performance of the robot 50 on the orthogonal coordinate system is degraded, or a state where the robot 50 cannot be controlled any more. The present invention allows the detection of such a state and switching to the operation of controlling the position of each axis according to operation force, so that the robot 50 can stably pass through near the singular configuration.

Then, according to a force applied to the tip 58 of the robot 50, the invention allows movement of each axis to a position to which the each axis cannot be moved by the operation of moving the position and/or the posture of the tip 58 of the robot 50 on the orthogonal coordinate system.

In addition, the invention allows movement operation for predetermined or desired each axis near singular configuration, as well as allows further simplification of the movement operation for each axis by selecting at least one appropriate axis as an operation axis.

In addition, the vicinity of singular configuration is also a place where a configuration that determines the position of each axis of the robot 50 changes. Accordingly, moving each axis near the singular configuration allows the robot 50 to pass through a position to which the robot 50 cannot be moved by moving the position and/or the posture of the tip 58 thereof on the orthogonal coordinate system and to be moved into another configuration. The "configuration" of the robot mentioned here is assumed to be a configuration that determines a state of each axis regarding how to set the position of the each axis that is not uniquely determined when moving the tip of the robot arm to a certain position and a certain posture. Then, when moving the position and/or the posture of the tip 58 of the robot 50 on the orthogonal coordinate system by applying a force to the tip 58 thereof, the robot 50 is once moved to the vicinity of the singular configuration, and the each axis is moved, thereby allowing movement operation on the orthogonal coordinate system in another configuration to be performed.

In addition, near or before any singular configuration, even a slight movement of the position on the orthogonal coordinate system can cause the rotation axis to be unintentionally significantly rotated. At this time, by switching to the movement operation of each axis near the singular configuration, each axis unintentionally moved can be moved back to an initial desired position.

The same operation of applying a force to the tip 58 of the robot 50 switches between the movement operation on the orthogonal coordinate system and the movement operation of moving each axis. This facilitates easier movement of the posture of the robot 50 to an arbitrary posture.

In addition, setting a axis that acts as a factor for being near a singular configuration or a axis that is caused to pass through near the singular configuration as an operation axis by the operation axis setting unit 25 facilitates switching from the control mode for performing the control of each axis to the control mode for performing the control of the position and/or the posture of the tip 58 of the robot 50 on the orthogonal coordinate system.

The present invention uses the state of being near any singular configuration to switch the control mode. Accordingly, the state of each axis of the robot 50 and a timing for switching between the control mode for performing the control on the orthogonal coordinate system and the control mode for moving the position of each axis are easily recognized, thus facilitating the operation of switching between the control modes.

Figure 18:
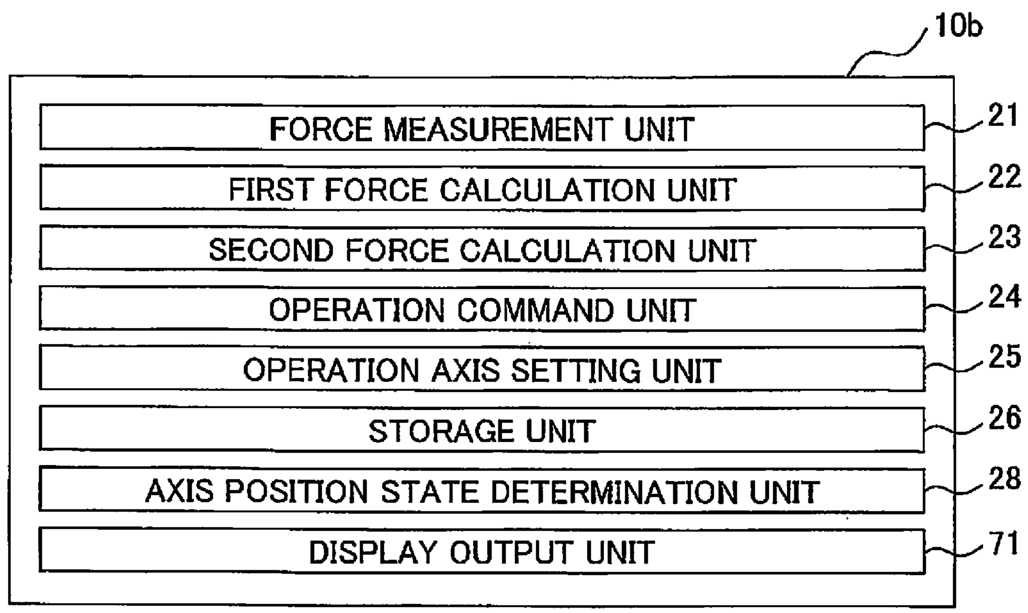
FIG. 18 is a diagram functionally depicting a structure of a robot control device according to a second embodiment of the embodiment.

FIG. 18 is a diagram functionally depicting a structure of a robot control device 10*b* according to a second embodiment of the present invention. As depicted in the drawing, the robot control device 10*b* includes a force measurement unit 21, a first force calculation unit 22, a second force calculation unit 23, an operation command unit 24, an operation axis setting unit 25, a storage unit 26, a axis position state determination unit 28, and a display output unit 71.

The robot control device 10*b* is adapted to use the axis position state determination unit 28, as an alternative to the near-singular configuration determination unit 27 of the robot control device 10*a*, so as to switch between the first control mode for controlling the position and/or the posture of the tip 58 of the robot 50 and the second control mode for controlling the position of each axis of the robot 50.

In addition, the operation axis setting unit 25 and the operation command unit 24 are adapted to use the axis position state determination unit 28 instead of the near-singular configuration determination unit 27. A description will be omitted regarding the same elements in the structure and functions of the robot control device 10*b* as those in the embodiment described regarding the robot control device 10*a* in relation with FIG. 2, as the robot control device 10 according to the first embodiment of the invention.

The axis position state determination unit 28 determines whether or not positions of one or more predetermined axes of the plurality of axes of the robot 50 are in a position of a state satisfying a predetermined positional relationship condition. For example, regarding the one or more axes of the robot 50, the axis position state determination unit 28 determines whether or not the position of each axis satisfies a predetermined positional relationship condition, i.e., whether or not the position of the each axis is within a range of a threshold value from a predetermined position set for the each axis. Alternatively, depending on a positional relationship between the plurality of axes, the axis position state determination unit 28 determines whether or not the position of the origin of a certain axis on the reference coordinate system satisfies the predetermined positional relationship condition. With the use of the axis position state determination unit 28 thus formed as the near-singular configuration determination unit 27, it may be determined whether or not the robot 50 is near singular configuration, by determining the state of the position of each axis.

The practical example of this case is the same as that described as the practical example of the near-singular configuration determination unit 27. In other words, for each state and each type of singular configuration, it is determined whether or not the position of each axis satisfies the predetermined positional relationship condition, i.e., whether or not the position of each axis is within the range of a threshold value from the predetermined position set for the each axis. Alternatively, depending on the positional relationship between the plurality of axes, it is determined whether or not the position of the origin of a certain axis on the reference coordinate system satisfies the predetermined positional relationship condition, thereby determining whether or not the position of the one or more predetermined axes of the robot 50 is in the predetermined state.

Even when the position of the one or more predetermined axes of the robot 50 is not in the predetermined state, such as the state of being near singular configuration, the axis position state determination unit 28 may determine whether or not the position of the tip 58 of the robot 50 is in a state into which the position thereof is usually not moved or rarely moved, when controlling the posture and/or the posture of the tip 58 of the robot 50.

The axis position state determination unit 28 detects that the positions of the predetermined axes are in such a state. In this case, as will be described later, the operation command unit 24 can easily switch between the first control mode for controlling the position and/or the posture of the tip 58 of the robot 50 and the second control mode for controlling the positions of the axes of the robot 50 during the movement operation of the robot 50.

When the axis position state determination unit 28 determines that the position of the one or more predetermined axes is in the state satisfying the predetermined positional relationship condition, the operation axis setting unit 25 sets, as one or more operation axes to be moved according to force, one or more predetermined axes including a axis that acts as a factor for being in the position of the state satisfying the predetermined positional relationship condition or a axis that is caused to pass through the position of the state satisfying the predetermined positional relationship condition, on the basis of a current position of each axis of the robot 50. In addition, the operation axis setting unit 25 sets the moving direction of the one or more operation axes determined according to the direction of the force.

At this time, the moving direction of the one or more operation axes determined according to the direction of the force is set on the basis of a predetermined value or on the basis of moving direction of the operation axes and the direction of the force applied to the operation axes at the time when the robot 50 becomes near singular configuration.

When setting the one or more operation axes by selecting one or more axes from among the plurality of axes, regarding any axis other than the axis that acts as the factor by which the position of the one or more predetermined axes is the position of the state satisfying the predetermined positional relationship condition or the axis that is caused to pass through the position of the state, a predetermined axis is selected as an operation axis on the basis of the position of each axis of the robot 50 at that time.

The operation command unit 24 outputs an operation command for moving the robot 50 by using an operation force calculated by the first force calculation unit 22 or the second force calculation unit 23 on the basis of the force measured by the force measurement unit 21 so that the robot 50 is moved according to the force applied to the tip 58 of the robot 50.

The operation command unit 24 includes a first control mode and a second control mode that move the robot 50, as control modes moving the robot 50. When the axis position state determination unit 28 determines that the position of the one or more predetermined axes is not a position of the state satisfying the predetermined positional relationship condition, the operation command unit 24 sets the control mode for moving the robot 50 to the first control mode. Meanwhile, when the axis position state determination unit 28 determines that the position of the one or more predetermined axes is the position of the state satisfying the predetermined positional relationship condition, the operation command unit 24 sets the control mode for moving the robot 50 to the second control mode. Then, the operation command unit 24 causes the robot 50 to be moved on the basis of the set control mode.

Figure 19:
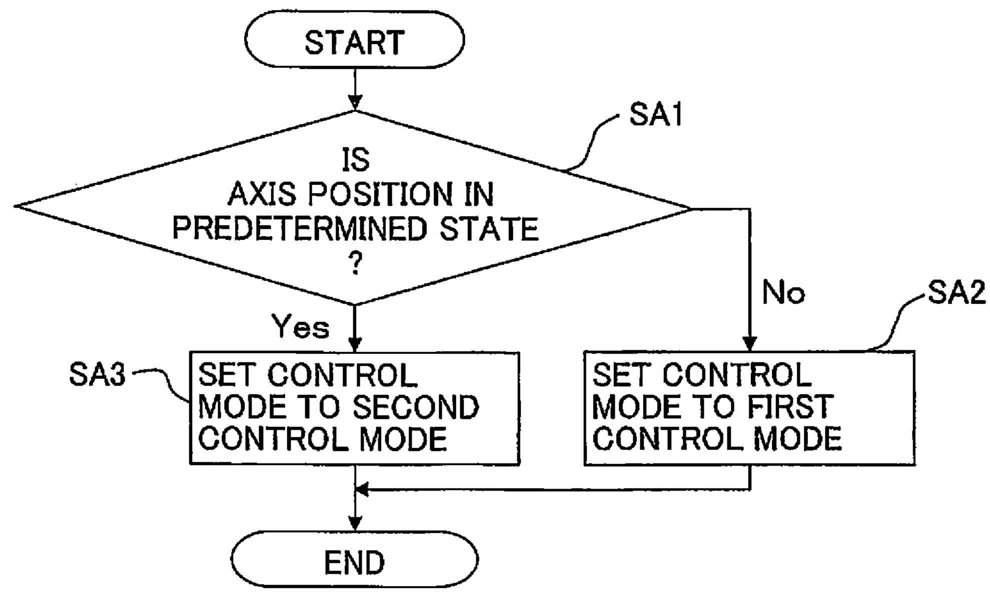
FIG. 19 is a flowchart depicting a process for processing by the robot control device according to the second embodiment of the invention.

Next, with reference to FIG. 19, a description will be given of an example of the process of processing performed by the robot control device 10*b* according to the second embodiment of the invention when the operator 60 moves the robot 50 by applying a force to the tip 58 of the robot 50. FIG. 19 is a flowchart depicting an example of the process of processing by the robot control device 10*b*.

Hereinafter, a description will be given of execution processing for switching between the control modes by the robot control device 10*b* when moving the robot 50 by applying a force to the tip 58 of the robot 50 with reference to the flowchart of FIG. 19 and a relevant drawing, and execution processing by the robot control device 10*b* when the control mode is the second control mode with reference to a flowchart of FIG. 8 and a relevant drawing.

It is to be noted that the series of processing that will be described here is merely one example and the present invention is not limited to the specific example. FIG. 19 is a diagram depicting one example of processing for setting the control modes.

When the processing of moving the robot 50 starts, the axis position state determination unit 28 determines whether or not the position of one or more predetermined axes is the position of the state satisfying the predetermined positional relationship condition (step SA1). Then, the axis position state determination unit 28 is used to determine whether to perform the control of the position and/or the posture of the tip 58 of the robot 50 on the orthogonal coordinate system at each control cycle or to perform the control of the position of desired each axis at each control cycle.

When the axis position state determination unit 28 determines that the position of the one or more predetermined axes is not the position of the state satisfying the predetermined positional relationship condition, the control mode is set to the first control mode (step SA2).

When the axis position state determination unit 28 determines that the position of the one or more predetermined axes is the position of the state satisfying the predetermined positional relationship condition, the control mode is set to the second control mode (step SA3).

Next, according to the control mode, the operation command for moving the robot 50 is changed. This method is the same as the processing described with reference to FIG. 7 regarding the processing performed when the control mode is the first control mode, and as the processing described with reference to FIG. 8 regarding the processing performed when the control mode is the second mode, as descried above.

In this way, the use of the axis position state determination unit 28 allows the switching between the first control mode for moving the position and/or the posture of the tip 58 of the robot 50 on the orthogonal coordinate system and the second control mode for moving the position of each axis of the robot 50 on the basis of the axes of the robot 50, and also allows the designation of a axis in operating each axis. Thus, while moving the robot 50 by applying a force to the tip 58 thereof, the control mode can be switched without performing any input task using a separately prepared input device.

In addition, while performing the operation of applying the force to the tip 58 of the robot 50, the position and/or the posture of the tip 58 thereof on the orthogonal coordinate system can be moved or desired each axis can be moved. For example, when the position and/or the posture of the tip 58 of the robot 50 on the orthogonal coordinate system is being moved by applying a force to the tip 58 thereof, desired each axis can be moved while applying the force to the tip 58 thereof to allow the tip 58 of the robot 50 to pass through a position to which the tip 58 thereof cannot be moved by any usual movement on the orthogonal coordinate system and then reach a position to which it cannot be usually moved from a certain position. After that, for example, movement on the orthogonal coordinate system can be performed again.

Accordingly, it is unnecessary for the operator to separately prepare a teaching device for switching the setting or to perform an input operation for switching the setting. Thus, cost reduction in the robot system can be achieved, and in movement operation, movement to an arbitrary position and an arbitrary posture on the orthogonal coordinate system and to an arbitrary axis position can be easily done, as well as the movement operation can be performed more smoothly, continuously, and comfortably.

Furthermore, a description will be given of a practical example of the processing for moving the position of each axis performed when the control mode is the second control mode. The following will be a description of a method in which when the axis position state determination unit 28 determines that the position of one or more predetermined axes is the position of the state satisfying the predetermined positional relationship condition, the operation axis setting unit 25 sets an operation axis and a moving direction of the operation axis determined according to the direction of the force on the basis of a current position of each axis in the step S22 of FIG. 8. Then, regarding the same case as above, a description will be additionally given of a method for calculating an operation force for moving an operation axis by the second force calculation unit 23 in the step S23 of FIG. 8 and a method for generating an operation command for moving the operation axis by the operation command unit 24 in the step S24 of FIG. 8.

First, the axis position state determination unit 28 is caused to determine whether or not the position of the J5 axis 55 set as the predetermined axis is within a predetermined threshold value. The predetermined threshold value is a value that does not usually allow movement of the position and/or the posture of the tip 58 of the robot 50. For example, in FIG. 1, the value is assumed to be a position of a state where the tip 58 and the flange 57 of the robot 50 come close to a link connecting the J4 axis 54 and the J5 axis 55 to a position to which the tip 58 and the flange 57 are usually not moved or a position of a state where the origin of the J3 axis 53, the origin of the J5 axis 55, and the origin of the flange 57 are located on a straight line or therenear (here in this position, the J5 axis 55 is assumed to be positioned at 0 degrees). In this case, it is determined whether or not the J5 axis 55 is positioned within a range of a threshold value from 0 degrees. When the J5 axis 55 is determined to be positioned within the threshold value, the position of the J5 axis 55 is assumed to be in the state satisfying the predetermined positional relationship condition.

The operation axis setting unit 25 sets one or more operation axes as follows, when the position of the J5 axis 55 is in the state satisfying the predetermined positional relationship condition i.e., when the position thereof is within the range of the threshold value from 0 degrees. The operation axis setting unit 25 sets one or more operation axes by selecting one or more axes from among the plurality of axes in such a manner as to include the J5 axis 55 that is a axis acting as a factor for being positioned in the state satisfying the predetermined positional relationship condition or a axis that is caused to pass through the position of the state satisfying the predetermined positional relationship condition.

In addition, regarding the one or more axes set as the operation axes, the operation axis setting unit 25 also sets a axis other than the axis acting as the factor for being positioned in the state satisfying the predetermined positional relationship condition or the axis that is caused to pass through the position of the state satisfying the predetermined positional relationship condition. In this example, according to the position of the J4 axis 54, the operation axis setting unit 25 also sets any axis other than the J5 axis 55, as an operation axis.

This is due to the following reason. In obtaining an operation force on the basis of a translational force applied around the rotation center line of the J5 axis 55, when the direction of the translational force applied to the tip 58 of the robot 50 is parallel to the rotation center line of the J5 axis 55, no operation force is substantially applied.

Accordingly, the J5 axis 55 is caused to be moved when applying a translational force close to a direction orthogonal to the rotation center line of the J5 axis 55. Then, when the direction of the translational force is any direction other than that, a different axis is caused to be moved.

When the position of the J4 axis 54 changes, an angle made by the rotation center line of the J5 axis 55 and the rotation center line of the J1 axis 51, an angle made by the rotation center line of the J5 axis 55 and the rotation center line of the J2 axis 52, and an angle made by the rotation center line of the J5 axis 55 and the rotation center line of the J3 axis 53 change. According to this state, in order to switch a axis set as an operation axis from among the J1 axis 51, the J2 axis 52, and the J3 axis 53, the operation axis setting unit 25 determines a axis to be set as an operation axis, by using the position of the J4 axis 54.

When the position of the J4 axis 54 is a position where the angle made by the rotation center line of the J5 axis 55 and the rotation center line of the J1 axis 51 is within a range of the threshold value from 90 degrees, the J1 axis 51 is set as an operation axis other than the J5 axis 55.

When the position of the J4 axis 54 is a position where the angle made by the rotation center line of the J5 axis 55 and the rotation center line of the J2 axis 52 is within the threshold value from 90 degrees, the J2 axis 52 is set as an operation axis other than the J5 axis 55. When the position of the J4 axis 54 is a position where the angle made by the rotation center line of the J5 axis 55 and the rotation center line of the J3 axis 53 is within a range of the threshold value from 90 degrees in a direction opposite to the direction in the case of the J2 axis 52, the J3 axis 53 is set as an operation axis other than the J5 axis 55.

When the position of the J4 axis 54 is a position that does not satisfy the above condition, the J4 axis 54 is set as an operation axis other than the J5 axis 55. In this way, the position of the J4 axis 54 can be moved to the above-mentioned position where each of the J1 axis 51, the J2 axis 52, and the J3 axis 53 is set as the operation axis.

In this case, when a position to which force is applied is located on the rotation center line of the J4 axis 54, the J4 axis 54 is moved by a moment of force as the operation force. When the position to which the force is applied is not located on the rotation center line of the J4 axis 54, the J4 axis 54 is moved by both of a translational force and a moment of force as the operation force.

In the above-described case, when the J4 axis 54 is in a position where the angle made by the rotation center line of the J5 axis 55 and the rotation center line of the J1 axis 51 is within a range of the threshold value from 90 degrees in a direction opposite to the direction in the above-mentioned case, another axis as an operation axis other than the J5 axis 55, for example, the J4 axis 54 may be set as an operation axis.

In this way, when the position of one or more predetermined axes is in the state satisfying the predetermined positional relationship condition, there are set a plurality of axes as operation axes, which include a axis acting as a factor for being in the position of the state satisfying the predetermined positional relationship condition or a axis caused to pass through the position of the state satisfying the predetermined positional relationship condition. Such a method may be applied to a method for implementing the robot control device 10*a*.

The one or more operation axes are selected in the manner as described above, and a moving direction determined according to the direction of the force in each operation axis is assumed to be the same as the direction of the force. In the step S23, the method by which the second force calculation unit 23 calculates an operation force for the one or more operation axes set by the operation axis setting unit 25 is assumed to be the same as the method in the robot control device 10*a*.

In the step S24, the operation command unit 24 generates an operation command for moving the position of the one or more operation axes set by the operation axis setting unit 25 on the basis of the operation force calculated by the second force calculation unit 23 and the moving direction determined according to the direction of the force set by the operation axis setting unit 25, similarly to the method in the robot control device 10*a*.

In a robot control device 10 according to a third embodiment of the present invention, the operation axis setting unit 25 further preferably sets a moving direction of one or more operation axes determined according to the direction of a force applied to the one or more operation axes on the basis of the direction of the force applied to the axes as the one or more operation axes and the moving direction of the axes as the one or more operation axes immediately before switching or when switched from the first control mode for moving the position and/or the posture on the orthogonal coordinate system to the second control mode for moving the position of each axis.

When a moving motion before going into the second control mode from the first control mode is not considered, there can be a feeling of discomfort, a feeling of oppression, and difficulty in operation. Moreover, depending on the movement operation of the tip 58 of the robot 50 on the orthogonal coordinate system, states associated with the control modes are repeatedly switched at a boundary between the position in the second control mode and the position in the first control mode, thereby causing an unstable motion.

Now, consideration will be given to a case of a certain operation axis in which the first control mode of a state where the direction of a force applied to the operation axis is opposite to the moving direction of the robot 50 is switched to the second control mode. In this case, when switched from the first control mode to the second control mode, unless the relationship between the direction of the force and the moving direction is made the same as the state immediately before the switching, the control mode can return to the first control mode as soon as the robot 50 is moved in the second control mode.

In order to avoid such circumstances, when switching from the first control mode to the second control mode, it is preferable to set a moving direction of the operation axis determined according to the direction of the force of the operation axis on the basis of the moving motion, the moving direction of the axis as the operation axis, and the direction of the force applied to the axis as the operation axis at the time when or immediately before switching to the second control mode. In this way, the robot can be continuously moved without a feeling of discomfort, a feeling of oppression, and difficulty in operation when the robot is moved from the state of the first control mode to the state of the second control mode to be caused to pass through the boundary between the control modes.

In the robot having the structure depicted in FIG. 1, the above-mentioned situation can occur when the origin of the J3 axis 53, the origin of the J5 axis 55, and the origin of the flange 57 are brought into a state of being located on the straight line and therenear while the position of the tip 58 of the robot 50 on the orthogonal coordinate system is being translationally moved.

At this time, the moving direction of the operation axis determined according to the direction of the force is set on the basis of the moving direction of the J5 axis 55 and the direction of the force applied to the J5 axis 55 before the origins thereof are brought into the above state or at the time when the origins thereof are near the above state.

Alternatively, when the movement operation of the tip 58 of the robot 50 on the orthogonal coordinate system has been performed before the above state occurs, the moving direction of the operation axis is set to a direction opposite to the direction of the force when the movement operation is a translational operation. Conversely, when the movement operation is a rotational operation, the moving direction of the operation axis may be made the same as the direction of the force. In this way, the direction of the movement operation on the orthogonal coordinate system performed before being near the above state can be made the same as the moving direction of the operation axis according to the force, whereby operability can be improved.

Thus, by considering the predetermined state and the moving motion before going into the vicinity of singular configuration, movement operation can be smoothly performed without a feeling of discomfort, a feeling of oppression, and difficulty in operation during transition into the above state and passage.

In a robot control device 10 according to a fourth embodiment of the present invention, further preferably, in the second mode, the operation command unit 24 moves the position of the origin of an operation axis of the one or more operation axes that is moved in a direction opposite to the direction of a force applied to the axis in a direction including a component of a direction opposite to a direction in which the position of the tip 58 of the robot 50 is moved by the motion of the operation axis or in a direction including a component of the direction of the force applied to the operation axis.

A practical example of such a movement operation will be described. In the robot 50 having the structure depicted in FIG. 1, when the origin of the J3 axis 53, the origin of the J5 axis 55, and the origin of the flange 57 are positioned in the predetermined state of being located on the straight line and therenear in the translational movement of the position of the tip 58 of the robot 50 on the orthogonal coordinate system, the control mode is switched to the second control mode, and the J5 axis 55 set as the operation axis is moved in a direction opposite to the direction of the force applied to the operation axis.

At this time, when only the J5 axis 55 is moved, a force-applied portion of the tip 58 of the robot 50 moves in a direction opposite to the direction in which the force is applied. This can make the operator feel uncomfortable, oppressed, and/or difficult to operate. In order to reduce such an unpleasant feeling, at the time of movement of the J5 axis 55, the J1 axis 51, the J2 axis 52, and the J3 axis 53 are simultaneously moved as operation axes. At this time, by moving the J1 axis 51, the J2 axis 52, and the J3 axis 53, the origin of the J5 axis 55 is moved in a direction including a component of a direction opposite to the direction in which the tip 58 of the robot 50 is moved by the motion of the J5 axis 55. Alternatively, by moving the J1 axis 51, the J2 axis 52, and the J3 axis 53, the origin of the J5 axis 55 is moved in a direction including a component of the direction of the force applied to the J5 axis 55. As a result, the position of the origin of the J5 axis 55 is moved in the direction in which the force is applied, which thus can reduce an amount of movement of the tip 58 of the robot 50 in the direction opposite to the direction in which the force is applied. Additionally, the tip 58 of the robot 50 can be moved in a direction close to the direction in which the force is applied.

However, when the movement amount of the position of the origin of the J5 axis 55 set as the operation axis moved in the direction opposite to the direction of the force applied to the axis is large, even if the position of each axis with respect to the J5 axis 55 is moved, an amount of change in an angle made by links with the J5 axis 55 portion therebetween becomes smaller along with the movement of the origin of the J5 axis 55. As a result, it takes time for the origins of the J3 axis 53, the origin of the J5 axis 55, and the origin of the flange 57 to pass through the positions of the predetermined state where the origins of the axes are located on the straight line and therenear. In some cases, the origins thereof may not be able to pass therethrough. In order to avoid such a situation, the movement amount of the position of the origin of the J5 axis 55 set as the operation axis moved in the direction opposite to the direction of the force applied to the axis may be set to substantially a value including an amount of the position of the tip 58 of the robot 50 moved by rotational moving motion of the J5 axis 55 by a value of a predetermined coefficient and an amount obtained by multiplying the amount of the movement by a predetermined coefficient value. Alternatively, the movement amount of the position of the origin of the J5 axis 55 is preferably set to a value obtained by multiplying the movement amount of the position of the tip 58 of the robot 50 by the motion of the J5 axis 55 by the predetermined coefficient.

In addition, a description will be given of another practical example for reducing the feelings of discomfort, oppression, and difficulty in operation caused by the movement of an operation axis in a direction opposite to the direction of an applied force in the second control mode. The rotation center lines of both the J2 axis 52 and the J3 axis 53 are assumed to be parallel and oriented in the same direction. In this case, when the J2 axis 52 is set as an operation axis that is moved to the direction opposite to the direction of the applied force, the J3 axis 53 may be moved as an operation axis that is moved in the same direction as the direction of the force. By moving the J3 axis 53 simultaneously with the J2 axis 52, the position of the origin of the J2 axis 52 moved in the direction opposite to the direction of the applied force can be moved in a direction including a component of a direction opposite to a direction in which the tip 58 of the robot 50 is moved by the motion of the J2 axis 52, or can be moved in a direction including a component of the direction of the force applied to the J2 axis 52. Alternatively, when the J3 axis 53 is set as an operation axis that is moved in the direction opposite to the direction of the applied force, the J2 axis 52 may be moved as an operation axis that is moved in the same direction as the direction of the force. By moving the J2 axis 52 simultaneously with the J3 axis 53, the position of the origin of the J3 axis 53 moved in the direction opposite to the direction of the applied force can be moved in a direction including a component of a direction opposite to a direction in which the tip 58 of the robot 50 is moved by the motion of the J3 axis 53, or can be moved in a direction including a component of the direction of the force applied to the J3 axis 53. This can make small the movement amount of the tip 58 of the robot 50 in the direction opposite to the direction of the force or can move the tip 58 of the robot 50 in the same direction as the direction of the force. Thus, the feelings of discomfort, oppression, and difficulty in operation can be reduced. By performing as described above, operability in moving the operation axis in the second control mode can be improved.

FIGS. 22A to 22D are partially enlarged diagrams of the robot 50. In the drawings, the operator 60 moves the robot 50 by applying a force F1 to the tip 58 of the robot 50 in an arrow direction. In this case, the tip 58 of the robot 50 is rotationally moved around the J5 axis 55 in a clockwise direction. Details about the moving motion will be described below.

Figure 22A:
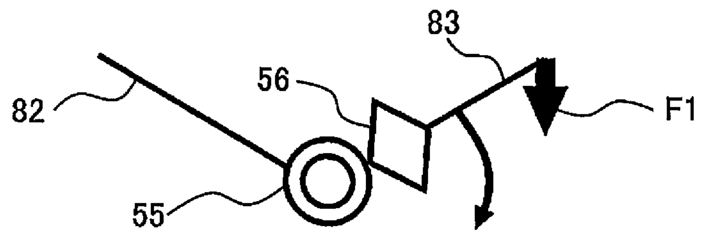
FIG. 22A is a partially enlarged diagram of the robot.

In FIG. 22A, the tip 58 of the robot 50 is rotationally moved around the J5 axis 55 in the first control mode for performing movement of the position and/or the posture on the orthogonal coordinate system according to the applied force. In this case, since the tip 58 of the robot 50 is rotationally moved around the J5 axis 55, only the J5 axis 55 is moved. With such a rotation movement, a link 82 (a link connecting the J3 axis 53 and the J4 axis 54 with the J5 axis 55) and a link 83 (a link connected to the flange 57 from the J5 axis 55 and the J6 axis 56) come to close to each other so as to form a straight line, as depicted in FIG. 22B.

Figure 22B:
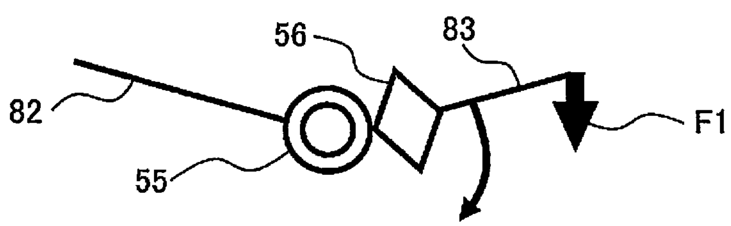
FIG. 22B is a partially enlarged diagram of the robot.

In the present invention, in the state depicted in FIG. 22B, at the time when the links 82 and 83 come close to each other so as to form the straight line, the first control mode is switched to the second control mode. The reason for this is that when the above portion with the J5 axis 55 comes close to the straight line in the robot 50 according to the embodiments of the invention, the robot 50 is near a singular configuration and thus movement in the first control mode cannot be executed.

On the basis of a force in a axis to be operated calculated by the second force calculation unit 23 and a moving direction of each axis at the time of or immediately before the second control mode, the operation axis setting unit 25 sets a moving direction determined according to the direction of the force in the second control mode. As seen from FIG. 22A, in this case, the direction of a moment of force around the J5 axis 55 is the same as the moving direction of the J5 axis 55.

Figure 22C:
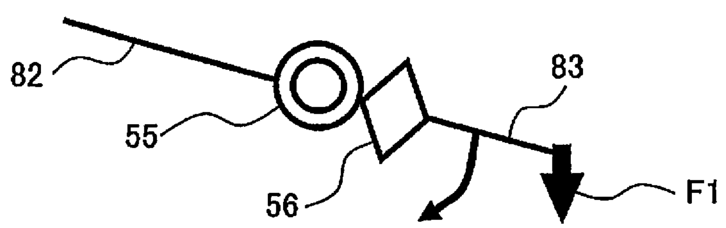
FIG. 22C is a partially enlarged diagram of the robot.
Figure 22D:
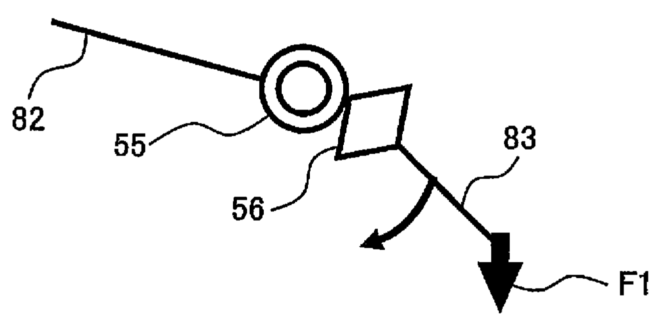
FIG. 22D is a partially enlarged diagram of the robot.
Figure 23A:
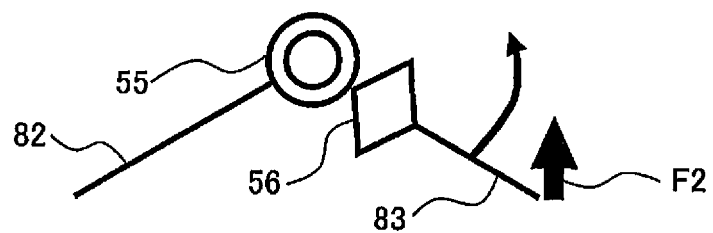
FIG. 23A is another partially enlarged diagram of the robot.
Figure 23B:
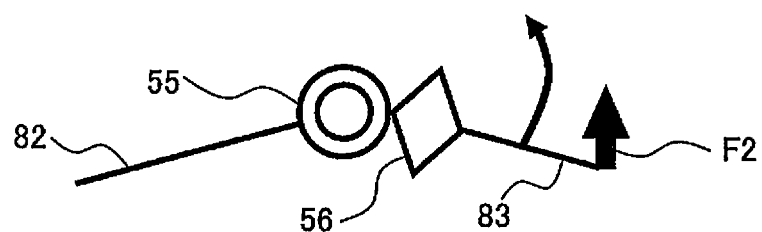
FIG. 23B is another partially enlarged diagram of the robot.
Figure 23C:
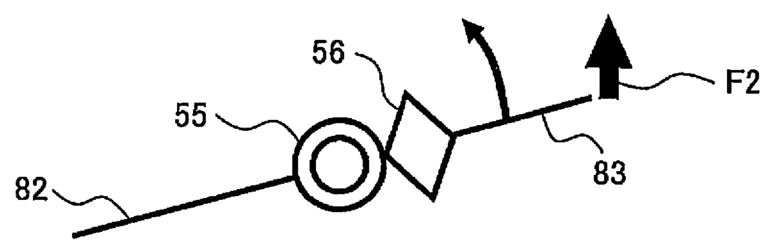
FIG. 23C is another partially enlarged diagram of the robot.
Figure 23D:
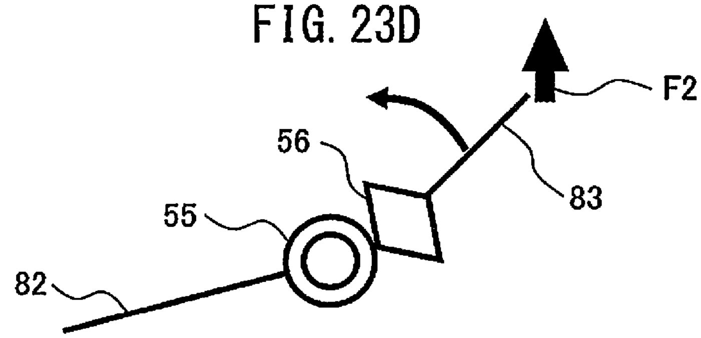
FIG. 23D is another partially enlarged diagram of the robot.

Then, as depicted in FIG. 22C, when the links 82 and 83 are located on the straight line or therenear, the second control mode is kept. Next, as depicted in FIG. 22D, when rotation movement proceeds and the links 82 and 83 go into a state where they do not form the straight line, the second control mode is switched to the first control mode.

As described above, in the states depicted in FIGS. 22A to 22D, when the operator 60 is moving the tip 58 of the robot 50 by applying the F1 to the tip 58 thereof, the first control mode is switched to the second control mode, which is then returned to the first control mode again. During this motion, the direction of the force F1 is the same as the direction of the rotation movement of the J5 axis 55. In other words, since the J5 axis 55 moves in the direction in which the force F1 is applied, the robot 50 can smoothly pass through the state of the second control mode.

In FIGS. 23A to 23D, the operator 60 rotationally moves the tip 58 of the robot 50 around the J5 axis 55 in a counter-clockwise direction by applying a force F2 to the tip 58 of the robot 50 in an arrow direction. In this case, the tip 58 of the robot 50 is moved in the first control mode in FIG. 23A, in the second control mode in FIGS. 23B and 23C, and in the first control mode in FIG. 23D. Even in this case, it will be obvious that there can be obtained the same effect as that depicted in FIGS. 22A to 22D.

FIGS. 24A to 24D are partially enlarged diagrams of the robot 50. In the drawings, the operator 60 moves the robot 50 by applying a force F3 to the tip 58 of the robot 50 in an arrow direction. In this case, the tip 58 of the robot 50 is rotationally moved around the J5 axis 55 in a counter-clockwise direction. Details about the moving motion will be described below.

Figure 24A:
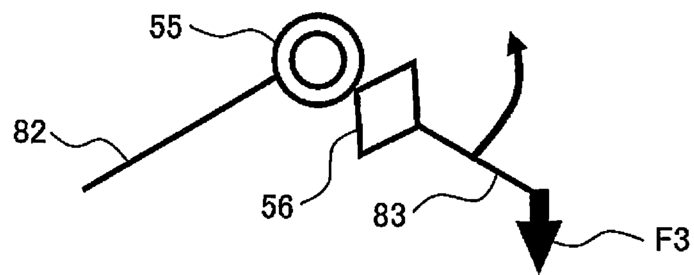
FIG. 24A is another partially enlarged diagram of the robot.

In FIG. 24A, the tip 58 of the robot 50 is translationally moved in a downward direction in the first control mode for moving the position and/or the posture of the tip 58 thereof on the orthogonal coordinate system according to the applied force. Unlike the state depicted in FIG. 22A, since the tip 58 of the robot 50 is translationally moved in the downward direction, not only the J5 axis 55 but also other axes of the robot 50 such as the J2 axis 52 and the J3 axis 53 are moved. This is due to maintaining the posture of the tip 58 of the robot 50. Accordingly, unlike the situation depicted in FIG. 22A, the tip 58 of the robot 50 is moved around the J5 axis 55 in the counter-clockwise direction. With such a translational movement, the links 82 and 83 come close to each other so as to form a straight line, as depicted in FIG. 24B.

Figure 24B:
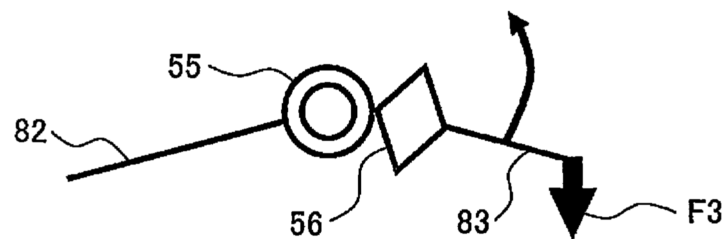
FIG. 24B is another partially enlarged diagram of the robot.

In the present invention, in the state depicted in FIG. 24B, at the time when the links 82 and 83 come close to each other so as to form the straight line, switching from the first control mode to the second control mode is performed. The reason for this is the same as that described above.

On the basis of a force in a axis to be operated calculated by the second force calculation unit 23 and a moving direction of each axis at the time of or immediately before the second control mode, the operation axis setting unit 25 sets a moving direction determined according to the direction of the force in the second control mode. As seen from FIG. 24B, in this case, the direction of a moment of force around the J5 axis 55 is opposite to the moving direction of the J5 axis 55.

Figure 24C:
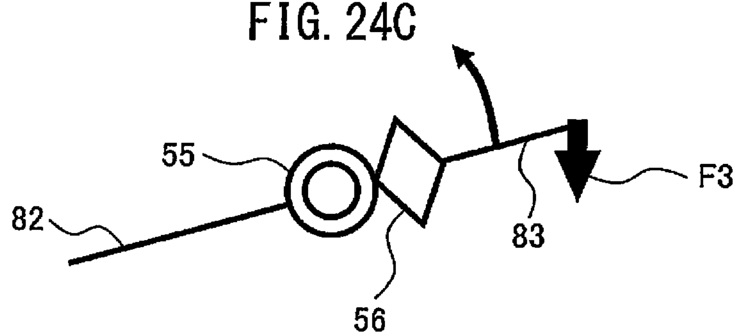
FIG. 24C is another partially enlarged diagram of the robot.
Figure 24D:
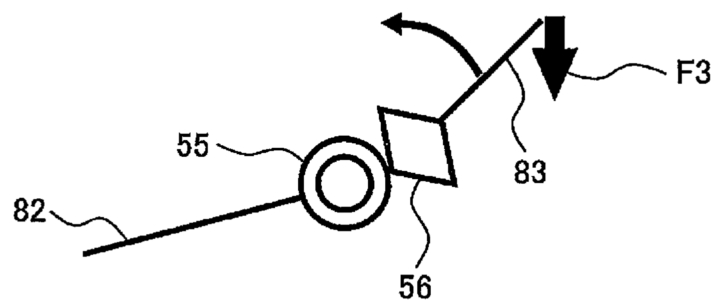
FIG. 24D is another partially enlarged diagram of the robot.

Then, as depicted in FIG. 24C, when the links 82 and 83 are located on the straight line or therenear, the second control mode is kept. Next, as depicted in FIG. 24D, when rotation movement of the J5 axis 55 proceeds and the links 82 and 83 go into the state where they do not form the straight line, the second control mode is switched to the first control mode.

As described above, in the states depicted in FIGS. 24A to 24D, when the operator 60 moves the tip 58 of the robot 50 by applying the F3 to the tip 58 thereof, the first control mode is switched to the second control mode, which is then returned to the first control mode again. During this motion, the direction of the rotation movement of the J5 axis 55 continues to be the same, so that the robot 50 can smoothly pass through the state of the second control mode.

In FIG. 24B in which the second control mode is switched to the first control mode, when the tip 58 of the robot 50 is set to be moved by making the direction of the force F3 the same as the direction of the rotation movement of the J5 axis 55, as a moving direction determined according to the direction of the force, the first control mode and the second control mode are repeatedly switched at a boundary therebetween, whereby the tip 58 of the robot 50 cannot be favorably moved in the second control mode.

Additionally, during the above motion, the direction of the rotation movement of the J5 axis 55 continues to be the same in the first and the second control modes. Thus, the robot 50 is allowed to smoothly pass through the state of the second control mode to be moved to another state of the first control mode.

Additionally, in the movement in the first control mode depicted in FIG. 24A, when the tip 58 of the robot 50 is translationally moved on the orthogonal coordinate system by applying the force in the downward direction, the tip 58 thereof is moved in the same downward direction as the direction of the force, so that the operator 60 does not feel discomfort. When moving the tip 58 of the robot 50 in the downward direction, the links 82 and 83 come to close to each other so as to form a straight line, from the state of FIG. 24A. At this time, the direction of the force F3 and the direction of the movement of the J5 axis 55 are opposite to each other.

Then, in the movement in the second control mode depicted in FIGS. 24B and 24C, the J5 axis 55 is caused to move in the direction opposite to the direction of the force F3 so that the robot 50 passes through the state of the second control mode. However, in this case, when only the J5 axis 55 is moved, the tip 58 of the robot 50 moves in the direction opposite to the direction of the applied force. As a result, the operator 60 may feel discomfort or difficulty to operate, as if he/she were pushed back and lifted up by the tip 58 of the robot 50.

In order to reduce such a feeling of discomfort or difficulty to operate, the position of the origin of the J5 axis 55 is preferably moved in the downward direction by using the J1 axis 51, the J2 axis 53, and the J3 axis 53 in the movement in the second control mode depicted in FIGS. 24B and 24C. At this time, the direction in which the position of the tip 58 of the robot 50 moves is determined by an amount of the tip 58 of the robot 50 moved by the J5 axis 55 and a movement amount of the position of the origin of the J5 axis 55. In addition, the position of the origin of the J5 axis 55 is determined by movement of the J1 axis 51, the J2 axis 52, and the J3 axis 53. The J1 axis 51, the J2 axis 52, and the J3 axis 53 are moved in such a manner as to minimize the movement amount in which the position of the tip 58 of the robot 50 is moved in the direction opposite to the direction of the force by the rotation movement of the J5 axis 55. This can reduce the feeling of being pushed back by the robot 50 that the operator 60 has. In the robot 50 depicted in the present practical example, the position of the origin of the J5 axis 55 is determined by the positions of the J1 axis 51, the J2 axis 53, and the J3 axis 53. Accordingly, the position of the origin of the J5 axis 55 can be moved in a desired direction by moving the J1 axis 51, the J2 axis 53, and the J3 axis 53 as operation axes in the manner as described above. In addition, in the axis structure of the robot 50, moving only the J1 axis 51, the J2 axis 53, and the J3 axis 53 leads to movement of the origin of the J5 axis 55, whereby the tip 58 of the robot 50 is also translationally moved in the same direction.

Figure 25:
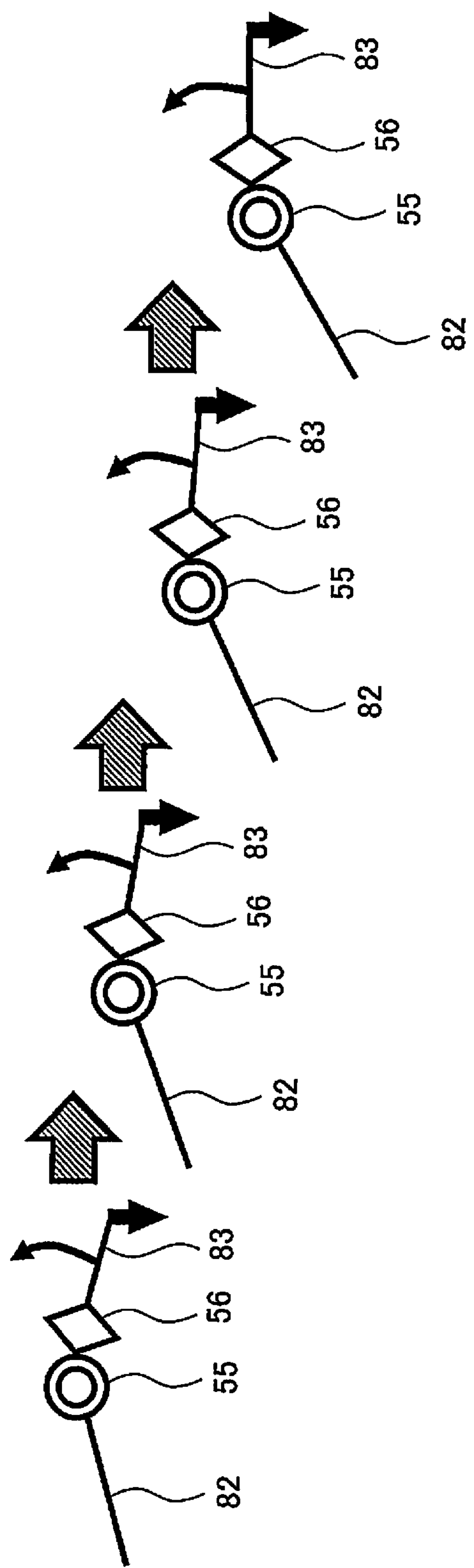
FIG. 25 is a partially enlarged diagram of the robot.
Figure 26A:
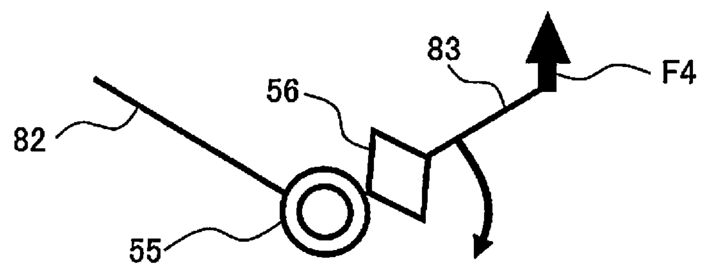
FIG. 26A is another partially enlarged diagram of the robot.
Figure 26B:
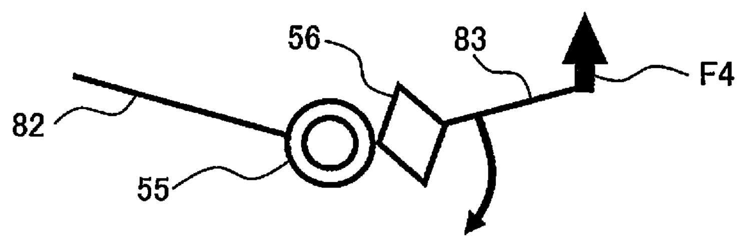
FIG. 26B is another partially enlarged diagram of the robot.
Figure 26C:
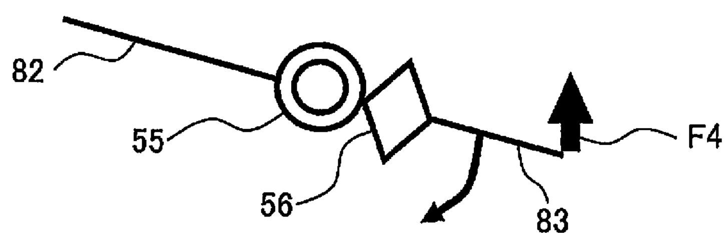
FIG. 26C is another partially enlarged diagram of the robot.
Figure 26D:
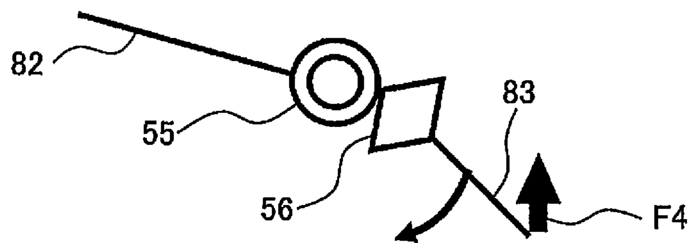
FIG. 26D is another partially enlarged diagram of the robot.

As described above, it is desirable to move from the state of the second control mode depicted in FIGS. 24C and 24D to the state depicted in FIG. 24D to switch to the first control mode. In this case, as depicted in FIG. 25, when the amount of the position of the origin of the J5 axis 55 and the position of the tip 58 of the robot 50 moved in the downward direction by moving the J1 axis 51, the J2 axis 53, and the J3 axis 53 as operation axes is large, the posture of the link 82 connected to the J5 axis 55 changes. In this case, although the J5 axis 55 moves in the moving direction depicted in the drawing, an amount of change in the angle made by the links 82 and 83 with the J5 axis 55 therebetween is small. Accordingly, it takes time to bring the relationship of the angle made by the links 82 and 83 with the J5 axis 55 therebetween into the state depicted in FIG. 24D, or there may be cases in which the relationship thereof does not reach such a state. Due to this, the movement amount of the position of the origin of the J5 axis 55 and the position of the tip 58 of the robot 50 that are moved in the downward direction is preferably maintained within a predetermined value by moving any axis other than an operation axis that is moved in the direction opposite to the direction of the force.

In FIGS. 26A to 26D, the operator 60 applies a force F4 to the tip 58 of the robot 50 in an arrow direction to rotationally move the tip 58 thereof in the first and the second control modes in the same direction around the J5 axis 55 whose rotation moving direction is a clockwise direction. In this case, the tip 58 of the robot 50 is moved in the first control mode in the state depicted in FIG. 26A, in the second control mode in FIGS. 268 and 26C, and in the first control mode in FIG. 26D. Even in such a case, it will be obvious that there can be obtained the same effect as that depicted in FIGS. 24A to 24D.

In a robot control device 10 according to a fifth embodiment of the present invention, preferably, the operation command unit 24 is further adapted to, when switching from one of the two control modes: the first and the second control modes to the other one thereof, switch after decelerating/stopping all the axes or making a velocity of all the axes smaller than a predetermined threshold value.

Thereby, the control mode is switched after decelerating all the axes forming the robot 50 to a safe velocity or decelerating/stopping all the axes. This allows a timing for switching between the control modes to be recognizable to the operator, and the operator can more safely operate the robot 50 according to the force.

In a robot control device 10 according to a sixth embodiment of the present invention, when switching from the first control mode to the second control mode is performed between the two control modes: the first control mode and the second control mode, the operation command unit 24 further preferably decelerates/stops axes other than axes that are operated in the second control mode.

Thereby, when switching the control mode from the first control mode to the second control mode, only axes not operated in the second control mode are decelerated/stopped, whereas one or more axes that are operated in the second control mode are continuously moved. Thus, movement operation can be continuously performed, and a quick movement to an intended position while maintaining safety can be performed, thereby allowing improvement in operability.

A robot control device 10 according to a seventh embodiment of the present invention further preferably includes a display output unit 71 that performs a display output as to which is the control mode: the first control or the second control mode, and, in the second control mode, performs a display output of one or more operation axes set by the operation axis setting unit 25 and a moving direction determined according to the direction of a force applied to the one or more operation axes.

Figure 20:
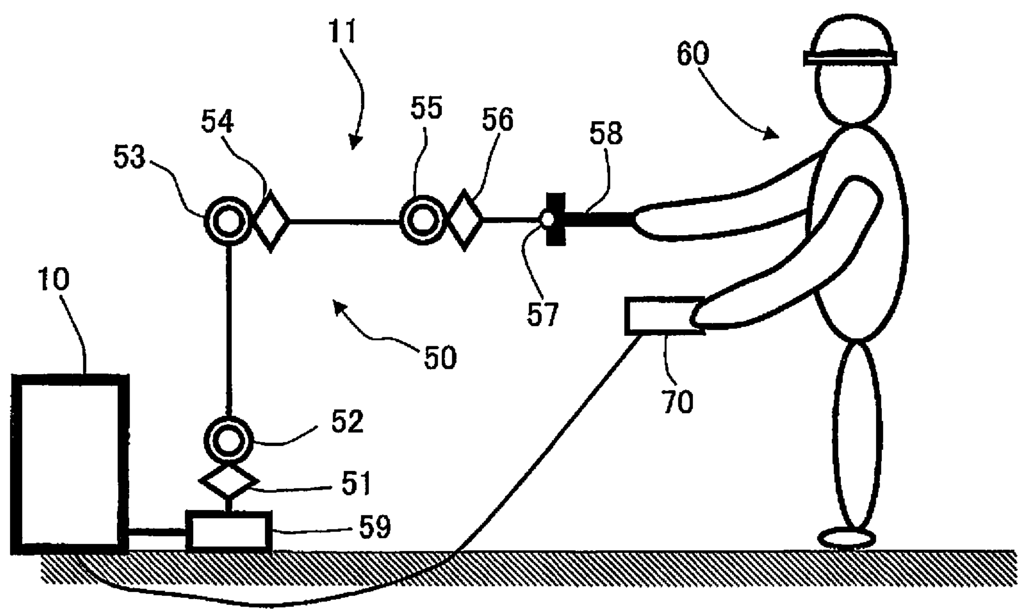
FIG. 20 is a diagram depicting an example of a position for attaching a display device to which a display output unit outputs in a robot system provided with a robot controlled by a robot control device according to another embodiment of the invention.

As depicted in FIG. 20, in a robot system 11 provided with the robot 50 controlled by a robot control device 10 according to another embodiment of the present invention, preferably, a display device 70 is connected to the robot control device 10 and performs a display output of various states regarding movement operation of the robot 50 on the basis of the display output by the display output unit 71 of the robot control device 10.

Figure 21:
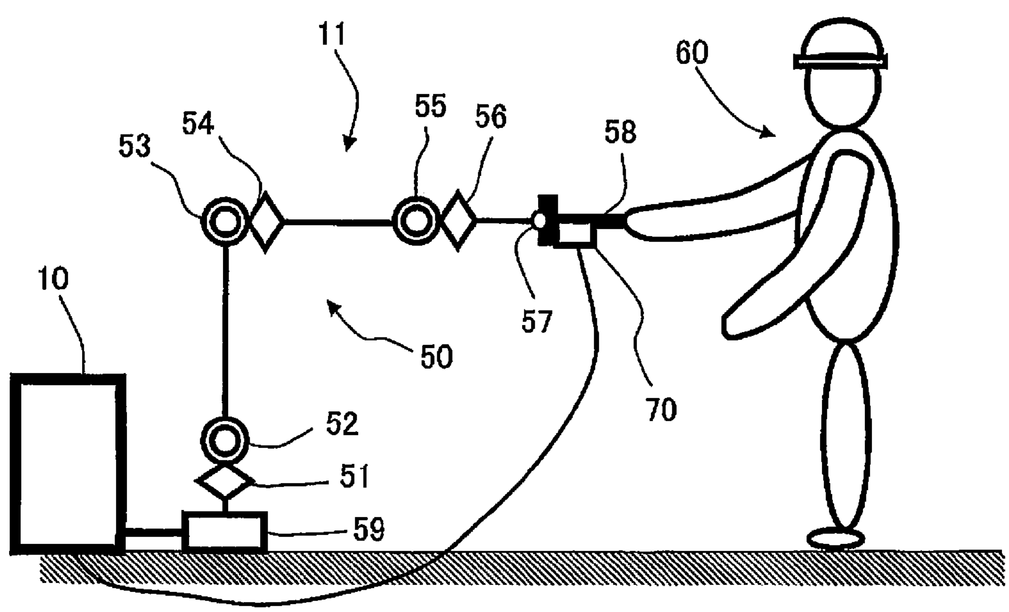
FIG. 21 is a diagram depicting an example of a position for attaching a display device to which a display output unit outputs in a robot system provided with a robot controlled by a robot control device according to still another embodiment of the invention.

Additionally, in order that the operator 60 does not have to hold the display device 10 when confirming the various states, the display device 70 may be attached as a display, a display lamp, or the like onto an appropriate place on the robot 50, for example, such as the tip 58 of the robot 50 as depicted in FIG. 21 or any of the links connecting the axes forming the robot 50 to each other. In addition, the display device 70 may be a device used also as an input device, and may be a device for inputting various settings and capable of inputting operation for moving and operation for stopping the robot 50.

The display output unit 71 depicted in FIGS. 2 and 18 displays whether the robot 50 is in a state of being moved according to a force or in a state of being moved by a teaching device or the like, and whether or not the robot 50 is in a movable state. Preferably, the display output unit 71 displays, regarding displaying as to whether or not the robot 50 is in the state of being movable according to a force, whether the force measurement unit 21 is in a state of being able to accurately measure the force, and also displays, in order to allow the force measurement unit 21 to measure a net force applied to the tip 58 of the robot 50 by the operator, for example, whether necessary information on a mass, a center of gravity, and the like of an object attached to the force sensor has been accurately acquired, whether the actuators for moving the axes of the robot 50 are ready to be operated, and the like.

In addition, when the robot 50 is in the state of being movable according to a force and when the robot 50 is being moved according to the force, the display device 70 performs a display output as to whether the control mode is the first control mode or the second control mode. Additionally, when the control mode is the second control mode, the display device 70 also displays one or more operation axes set by the operation axis setting unit 25 and a moving direction determined according to the force of the one or more operation axes.

In this case, in the structural example of the robot control device 10*a* depicted in FIG. 2, the display output unit 71 further performs a display output of a state of being in a singular configuration, the type of the singular configuration, a axis that acts as a factor for being near the singular configuration, a axis that is caused to pass through near the singular configuration, and the like.

Additionally, in the structural example of the robot control device 10*b* depicted in FIG. 18, the display output unit 71 further performs a display output regarding that the position of a predetermined axis is in a state satisfying a predetermined positional relationship condition, what kind of predetermined positional relationship condition is satisfied by the position of the predetermined axis, a axis that acts as a factor for being in the position of the above state, a axis that is caused to pass through the position of the above state, and the like. This can improve operability.

Advantageous Effects of the Invention

According to the first aspect, one or more axes to be operated are selected on the basis of a current position of each axis of the robot, whereby desired each axis and a axis caused to pass through singular configuration of the robot can be moved according to a force applied to the tip of the robot.

In addition, the first control mode for moving the position and/or the posture of the tip of the robot on the orthogonal coordinate system on the basis of the position of each axis of the robot and the second control mode for moving the position of each axis can be switched, as well as the designation of a axis in operating each axis can be made. Accordingly, while moving the robot by applying a force to the tip of the robot, the control mode can be switched without performing any input task using a separately prepared input device.

In addition, while performing the operation of applying a force to the tip of the robot, the position and/or the posture of the tip of the robot on the orthogonal coordinate system can be moved and desired each axis can be moved. For example, when moving the position and/or the posture of the tip of the robot on the orthogonal coordinate system by applying a force to the tip thereof, desired each axis can be moved while applying a force to the tip of the robot, whereby the robot is allowed to pass through a position to which it cannot be moved by usual movement on the orthogonal coordinate system and then allowed to reach a position to which it cannot be usually moved from a certain position. After that, movement on the orthogonal coordinate system, and the like, can be performed again.

This eliminates the necessity for the operator to separately prepare a teaching device for switching the setting and to perform an input operation for switching the setting. Accordingly, cost reduction in the robot system can be achieved, and in movement operation, movement to an arbitrary position and/or an arbitrary posture on the orthogonal coordinate system and to an arbitrary axis position can be easily performed, as well as such a movement operation can be more smoothly, continuously, and comfortably performed.

In addition, the robot is allowed to pass through near any singular configuration where it is impossible or difficult to perform movement operation for the position and/or the posture of the tip of the robot on the orthogonal coordinate system or where movement operation therefor becomes unstable, and the movement operation in such a state can be easily performed. Furthermore, the robot can be stably and safely moved by early detecting a vicinity of the singular configuration where movement operation for the position and/or the posture of the tip thereof on the orthogonal coordinate system tends to be unstable and moving desired each axis.

In addition, a timing of switching between the control modes is easily recognized by switching the control mode for movement during movement operation by using a position to which the robot is not moved by usual movement operation for the position and/or the posture of the tip thereof on the orthogonal coordinate system and the state of being near singular configuration.

Additionally, when using the vicinity of singular configuration as a position for switching between the control modes, the vicinity of singular configuration is also a place where the configuration that determines the positions of axes of the robot changes. Accordingly, in this way, the robot can be moved into another configuration. The "configuration" of the robot mentioned here is assumed to be a configuration that determines a state of each axis regarding how to set the position of the each axis that is not uniquely determined when moving the tip of the robot to a certain position and a certain posture. In other words, when moving the robot on the orthogonal coordinate system by applying a force to the tip of the robot, the robot is once moved to the vicinity of a singular configuration, and each axis is moved by the application of the force to the tip thereof to allow the robot to pass through a position to which it cannot be moved by movement operation on the orthogonal coordinate system and to be moved into another configuration, thereby allowing movement operation on the orthogonal coordinate system in the other configuration.

Additionally, near any singular configuration or therebefore, a rotation axis can be unintentionally significantly rotated even with a slight movement of the position thereof on the orthogonal coordinate system. In this case, unintentionally moved each axis can be returned to an initial desired position by switching to the force control for each axis near the singular configuration.

Additionally, when moving the robot on the orthogonal coordinate system by applying a force to the tip thereof, the position of each axis is intentionally changed to a position to which the each axis is not moved by usual motion on the orthogonal coordinate system. Thereby, the each axis can be moved according to the force applied to the tip thereof by the same operation of applying the force thereto. As a result, the posture of the robot can be easily moved to an arbitrary posture.

According to the second aspect, the use of the axis position state determination unit allows switching between the first control mode for moving the position and/or the posture of the tip of the robot on the orthogonal coordinate system on the basis of the position of each axis of the robot and the second control mode for moving the position of each axis of the robot. Additionally, designation of a axis in operating each axis can be made. Thus, while moving the robot by applying a force to the tip of thereof, switching between the control modes can be done without performing any input task using a separately prepared input device.

In addition, while performing the operation of applying a force to the tip of the robot, the position and/or the posture of the tip of the robot on the orthogonal system can be moved and desired each axis can be moved. For example, when the position and/or the posture of the tip of the robot on the orthogonal coordinate system is being moved by applying a force to the tip thereof, desired each axis is moved while applying the force to the tip thereof to allow the robot to pass through a position to which it cannot be moved by usual movement on the orthogonal coordinate system and then reach a position to which it cannot be usually moved from a certain position. After that, movement on the orthogonal coordinate system, and the like, can be performed again.

This eliminates the necessity for the operator to separately prepare a teaching device for switching the setting or perform an input operation for switching the setting. Accordingly, cost reduction in the robot system can be achieved, and in movement operation, movement to an arbitrary position and/or an arbitrary posture on the orthogonal coordinate system and to an arbitrary axis position can be easily performed, as well as such a movement operation can be more smoothly, continuously, and comfortably performed.

Additionally, when moving the robot on the orthogonal coordinate system by applying a force to the tip thereof, the position of each axis is intentionally changed to a position to which the each axis is not moved by usual motion on the orthogonal coordinate system. Thereby, the each axis can be moved according to the force applied to the tip thereof by the same operation of applying the force thereto. As a result, the posture of the robot can be easily moved to an arbitrary posture.

According to the third aspect, the robot can continuously perform a motion intended by the operator, and the operator can continue the operation without a feeling of discomfort.

In moving the position of each axis according to the force, when the operation axis is moved in a direction opposite to the direction of the force applied to the operation axis, the operator may feel uncomfortable, oppressed, and/or difficult to operate due to the movement of the operation axis in the direction opposite to the direction of the applied force. According to the fourth aspect, such feelings of discomfort, oppression, and difficulty that may be experienced by the operator when applying a force can be reduced, thereby allowing improvement in operability.

According to the fifth aspect, switching between the first control mode and the second control mode can be safely performed.

According to the sixth aspect, when switching from the first control mode to the second control mode, movement operation can be more continuously performed.

According to the seventh aspect, movement operation can be more simply and easily performed.

While various embodiments and modifications of the present invention have been described hereinabove, it is obvious to those skilled in the art that the intended function effects of the invention can be achieved also by other embodiments and modifications. In particular, it is possible to remove or replace the elements of the above-described embodiments and modifications, and it is possible to further add a known unit, without departing from the scope of the invention. In addition, it is obvious to those skilled in the art that the invention can be implemented also by arbitrarily combining the features of the plurality of embodiments implicitly or explicitly disclosed herein. In other words, other forms conceivable within the range of the technical idea of the invention are also included within the scope of the invention.

What is claimed is:

1. A robot control device of a robot system for moving a robot which includes a plurality of axes, the robot control device comprising:
- a force measurement unit configured to measure a measured force applied to a tip of the robot;
- a first force calculation unit configured to calculate a first operation force for performing a first movement operation of at least one of a position and a posture of the tip of the robot on the basis of the measured force;
- a second force calculation unit configured to calculate a second operation force for performing a second movement operation of a position of each of the plurality of axes of the robot on the basis of the measured force;
- a near-singular configuration determination unit configured to determine whether or not the robot is near a singular configuration;
- an operation axis setting unit configured to, according to a current position of each of the plurality of axes when the near-singular configuration determination unit determines that the robot is near the singular configuration,
  - set at least one of (i) a first axis that acts as a factor for being near the singular configuration or (ii) a second axis that is caused to pass through near the singular configuration, as at least one operation axis to be moved according to the measured force, and
  - set a moving direction of the at least one operation axis according to a direction of the measured force; and
- an operation command unit configured to,
  - in a first control mode when the near singular configuration determination unit determines that the robot is not near the singular configuration,
    - output a first operation command for moving the at least one of the position and the posture of the tip of the robot on the basis of the first operation force calculated by the first force calculation unit, and
  - in a second control mode when the near-singular configuration determination unit determines that the robot is near the singular configuration,
    - output a second operation command for moving a position of the at least one operation axis on the basis of the second operation force calculated by the second force calculation unit and the moving direction set by the operation axis setting unit.

2. The robot control device according to claim 1,
- wherein the operation axis setting unit is configured to set the moving direction of the at least one operation axis in the second control mode on the basis of the direction of the measured force and the moving direction of the at least one operation axis immediately before being switched to the second control mode or when switched to the second control mode.

3. The robot control device according to claim 1,
- wherein, in the second control mode, the operation command unit is configured to move
  - a position of an origin of an operation axis among the at least one operation axis that is to be moved in a first direction opposite to the direction of the measured force
    - in a second direction including a component of a third direction opposite to a fourth direction in which the position of the tip of the robot is moved by the at least one operation axis, or
    - in a fifth direction including a component of the direction of the measured force.

4. The robot control device according to claim 1,
- wherein when the operation command unit switches from the first control mode to the second control mode,
  - the operation command unit is configured to switch after decelerating or stopping of all of the plurality of axes or makes a velocity of all of the plurality of axes smaller than a predetermined threshold value.

5. The robot control device according to claim 1,
- wherein when the operation command unit switches from the first control mode to the second control mode,
  - the operation command unit is configured to decelerate or stop axes other than axes that are operated in the second control mode.

6. The robot control device according to claim 1, further comprising
- a display output unit configured to
  - perform a display output as to which one of the first control mode and the second control mode is set, and
  - in the second control mode, perform a display output of the at least one operation axis set by the operation axis setting unit and the moving direction of the of the at least one operation axis set by the operation axis setting unit.

7. A robot control device of a robot system for forming a robot that includes a plurality of axes, the robot control device comprising:
- a force measurement unit configured to measure a measured force applied to a tip of the robot;
- a first force calculation unit configured to calculate a first operation force for performing a first movement operation of at least one of a position and a posture of the tip of the robot on the basis of the measured force;
- a second force calculation unit configured to calculate a second operation force for performing a second movement operation of a position of each of the plurality of axes of the robot on the basis of the measured force;
- an axis position state determination unit configured to determine whether or not at least one predetermined axis among the plurality of axes is in a position of a state satisfying a predetermined positional relationship condition; and
- an operation axis setting unit configured to, according to a current position of each of the plurality of axes of the robot when the axis position state determination unit determines that the at least one predetermined axis is in the position of the state,
  - set at least one of (i) a first axis that acts as a factor for being in the position of the state or (ii) a second axis that is caused to pass through the position of the state, as at least one operation axis to be moved according to the measured force, and
  - set a moving direction of the at least one operation axis according to a direction of the measured force; and
- an operation command unit configured to,
  - in a first control mode when the axis position state determination unit determines that the at least one predetermined axis is not in the position of the state,
    - output a first operation command for moving the at least one of the position and the posture of the tip of the robot on the basis of the first operation force calculated by the first force calculation unit, and
  - in a second control mode when the axis position state determination unit determines that the at least one predetermined axis is in the position of the state,
    - output a second operation command for moving a position of the at least one operation axis on the basis of the second operation force calculated by the second force calculation unit and the moving direction set by the operation axis setting unit.

8. The robot control device according to claim 7, wherein the operation axis setting unit is configured to set, the moving direction of the at least one operation axis in the second control mode on the basis of the direction of the measured force and the moving direction of the at least one operation axis immediately before being switched to the second control mode or when switched to the second control mode.

9. The robot control device according to claim 7, wherein, in the second control mode, the operation command unit is configured to move a position of an origin of an operation axis among the at least one operation axis that is to be moved in a first direction opposite to the direction of the measured force in a second direction including a component of a third direction opposite to a fourth direction in which the position of the tip of the robot is moved by the at least one operation axis or in a fifth direction including a component of the direction of the measured force.

10. The robot control device according to claim 7, wherein, when the operation command unit switches from the first control mode to the second control mode:

the operation command unit is configured to switch after decelerating or stopping all of the plurality of axes or makes a velocity of all of the plurality of axes smaller than a predetermined threshold value.

11. The robot control device according to claim 7, wherein when the operation command unit switches from the first control mode to the second control mode:

the operation command unit is configured to decelerate or stop axes other than axes that are operated in the second control mode.

12. The robot control device according to claim 7, further comprising a display output unit configured to perform a display output as to which one of the first control mode and the second control mode is set, and in the second control mode, perform a display output of the at least one operation axis set by the operation axis setting unit and the moving direction of the of the at least one operation axis set by the operation axis setting unit.

* * * * *